United States Patent
Kawamura et al.

(10) Patent No.: US 10,306,188 B2
(45) Date of Patent: May 28, 2019

(54) PHOTOGRAPHIC IMAGE EXCHANGE SYSTEM, IMAGING DEVICE, AND PHOTOGRAPHIC IMAGE EXCHANGE METHOD

(71) Applicant: HONDA MOTOR CO., LTD., Minato-ku, Tokyo (JP)

(72) Inventors: Tamotsu Kawamura, Sakura (JP); Kotaro Shigeno, Utsunomiya (JP); Hiroshi Akiyama, Utsunomiya (JP); Masaki Negoro, Milton Keynes (GB); Yoshinori Matsuo, Utsunomiya (JP); Naoki Sugimoto, Sunnyvale, CA (US); Dennis Clark, Menlo Park, CA (US); John Moon, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 136 days.

(21) Appl. No.: 15/317,389

(22) PCT Filed: Jun. 9, 2015

(86) PCT No.: PCT/JP2015/066587
§ 371 (c)(1),
(2) Date: Dec. 8, 2016

(87) PCT Pub. No.: WO2015/190473
PCT Pub. Date: Dec. 17, 2015

(65) Prior Publication Data
US 2017/0208294 A1 Jul. 20, 2017

(30) Foreign Application Priority Data

Jun. 12, 2014 (JP) .................. 2014-121613

(51) Int. Cl.
*H04N 7/18* (2006.01)
*G06K 9/00* (2006.01)
*G08G 1/017* (2006.01)

(52) U.S. Cl.
CPC ......... *H04N 7/183* (2013.01); *G06K 9/00791* (2013.01); *G08G 1/0175* (2013.01); *H04N 7/181* (2013.01); *H04N 7/188* (2013.01)

(58) Field of Classification Search
CPC ... B60R 2300/40; B60R 1/00; B60R 2300/50; G08G 1/163; G08G 1/161; H04N 7/181; G06Q 50/01; G06F 16/58; H04L 51/10
See application file for complete search history.

(56) References Cited

U.S. PATENT DOCUMENTS

| 7,113,977 B1* | 9/2006 | Baker | G06Q 10/107 709/206 |
| 7,778,770 B2* | 8/2010 | Sakagami | G01C 21/26 340/993 |

(Continued)

FOREIGN PATENT DOCUMENTS

| JP | 2004-294283 A | 10/2004 |
| JP | 2005-267146 A * | 9/2005 |

(Continued)

OTHER PUBLICATIONS

Tamaru, machine generated translation of JP-2005-267146 A, Sep. 2005.*

(Continued)

*Primary Examiner* — David E Harvey
(74) *Attorney, Agent, or Firm* — Carrier Blackman & Associates, P.C.; Joseph P. Carrier; Jeffrey T. Gedeon

(57) ABSTRACT

A photographic image exchange system includes an imaging device having an imager that performs imaging, a communicator that performs communication with a server, and a controller that controls the communicator such that an image (Continued)

that includes a registered target among images captured by the imager is transmitted to the server, and the server provides the image received from the imaging device to a device used by a user who is related to the registration.

13 Claims, 14 Drawing Sheets

(56) References Cited

U.S. PATENT DOCUMENTS

| | | | | |
|---|---|---|---|---|
| 8,194,940 | B1* | 6/2012 | Kiyohara | H04L 63/10 382/118 |
| 8,422,747 | B1* | 4/2013 | Leung | H04L 51/32 382/118 |
| 8,655,028 | B2* | 2/2014 | Hsi | G06K 9/00288 382/118 |
| 9,043,483 | B2* | 5/2015 | Grigsby | G08G 1/161 709/201 |
| 9,152,849 | B2* | 10/2015 | Ganong | G06F 17/30247 |
| 9,237,182 | B1* | 1/2016 | Smus | G06K 9/00 |
| 9,342,817 | B2* | 5/2016 | Elliott | G06Q 10/101 |
| 9,602,454 | B2* | 3/2017 | Salvador | G06F 16/583 |
| 9,618,970 | B2* | 4/2017 | Lee | H04N 5/2628 |
| 9,626,551 | B2* | 4/2017 | Yano | G06K 9/00281 |
| 9,628,986 | B2* | 4/2017 | Baldwin | H04L 29/08657 |
| 9,767,305 | B2* | 9/2017 | Ruben | G06T 19/20 |
| 9,883,134 | B2* | 1/2018 | Pulkkinen | G08C 17/02 |
| 9,978,272 | B2* | 5/2018 | Basir | G08G 1/0962 |
| 10,140,552 | B2* | 11/2018 | Steiner | G06K 9/00677 |
| 2003/0053608 | A1* | 3/2003 | Ohmae | H04N 1/00132 379/93.25 |
| 2004/0153970 | A1* | 8/2004 | Shinoda | H04N 1/00132 715/273 |
| 2008/0274798 | A1* | 11/2008 | Walker | G07F 17/32 463/25 |
| 2009/0231432 | A1* | 9/2009 | Grigsy | G08G 1/161 348/149 |
| 2009/0318119 | A1* | 12/2009 | Basir | H04M 1/271 455/413 |
| 2010/0158315 | A1* | 6/2010 | Martin | G06Q 30/02 382/103 |
| 2010/0232656 | A1* | 9/2010 | Ryu | G06F 17/218 382/118 |
| 2010/0325218 | A1* | 12/2010 | Castro | G06Q 10/10 709/206 |
| 2011/0013810 | A1* | 1/2011 | Engstrom | G06K 9/00288 382/118 |
| 2011/0064281 | A1* | 3/2011 | Chan | G06Q 50/01 382/118 |
| 2011/0066743 | A1* | 3/2011 | Hurley | H04W 4/02 709/231 |
| 2011/0121991 | A1* | 5/2011 | Basir | G08G 1/0962 340/902 |
| 2011/0122244 | A1* | 5/2011 | Cho | H04N 7/183 348/113 |
| 2011/0161423 | A1* | 6/2011 | Pratt | H04L 51/10 709/205 |
| 2011/0202968 | A1* | 8/2011 | Nurmi | G06F 21/10 726/1 |
| 2012/0007975 | A1* | 1/2012 | Lyons | G06K 9/00771 348/77 |
| 2012/0239618 | A1* | 9/2012 | Kung | G06F 21/6218 707/621 |
| 2012/0287274 | A1* | 11/2012 | Bevirt | H04N 7/185 348/144 |
| 2013/0101181 | A1* | 4/2013 | Hsi | G06F 16/583 382/118 |
| 2013/0124508 | A1* | 5/2013 | Paris | G06F 16/51 707/723 |
| 2013/0158778 | A1 | 6/2013 | Tengler et al. | |
| 2013/0159884 | A1* | 6/2013 | Isozu | H04W 4/023 715/753 |
| 2013/0243273 | A1 | 9/2013 | Yamaji et al. | |
| 2014/0002663 | A1* | 1/2014 | Garland | H04N 7/188 348/159 |
| 2014/0036088 | A1* | 2/2014 | Gabriel | H04N 1/00137 348/157 |
| 2014/0229538 | A1* | 8/2014 | Ramachandran | G06F 17/30029 709/204 |
| 2014/0324247 | A1* | 10/2014 | Jun | G07C 5/0866 701/1 |
| 2014/0341434 | A1* | 11/2014 | Lin | G08G 1/166 382/104 |
| 2015/0006637 | A1* | 1/2015 | Kangas | H04L 67/10 709/204 |
| 2015/0081791 | A1* | 3/2015 | Jacobs | G06F 16/583 709/204 |
| 2015/0149548 | A1* | 5/2015 | Jung | H04L 67/18 709/204 |
| 2015/0242638 | A1* | 8/2015 | Bitran | G06F 21/6245 726/26 |
| 2015/0312353 | A1* | 10/2015 | Chen | H04W 4/046 709/228 |
| 2015/0312354 | A1* | 10/2015 | Boyle | H04N 21/21805 709/219 |
| 2015/0317801 | A1* | 11/2015 | Bentley | H04N 7/181 382/107 |
| 2015/0347827 | A1* | 12/2015 | Dickinson | G06K 9/00302 382/103 |
| 2015/0356121 | A1* | 12/2015 | Schmelzer | G06F 16/21 707/803 |
| 2016/0037055 | A1* | 2/2016 | Waddington | H04N 5/23216 348/211.8 |
| 2016/0162529 | A1* | 6/2016 | Panelli | B60Q 1/503 707/609 |
| 2016/0191434 | A1* | 6/2016 | Rice | H04L 51/38 709/204 |
| 2016/0277601 | A1* | 9/2016 | Seymour | H04N 7/181 |
| 2017/0208294 | A1* | 7/2017 | Kawamura | G06K 9/00791 |
| 2018/0005062 | A1* | 1/2018 | Aguera-Arcas | G06K 9/00221 |

FOREIGN PATENT DOCUMENTS

| | | |
|---|---|---|
| JP | 2009-245385 A | 10/2009 |
| JP | 2010-26620 A * | 2/2010 |
| JP | 2010-086201 A | 4/2010 |
| JP | 2010-257253 A | 11/2010 |
| JP | 2011-101395 A | 5/2011 |
| JP | 2012-198790 A | 10/2012 |
| JP | 2013-168078 A | 8/2013 |
| JP | 2013-191035 A | 9/2013 |
| WO | 2013/118288 A1 | 8/2013 |

OTHER PUBLICATIONS

Nara, Machione generated translation of JP-2010-026620-A. Feb. 2010.*
Office Action, dated Oct. 10, 2017, issued in the corresponding Japanese Patent Application 2016-527815 with the English translation thereof.
PCT/ISA/210 from PCT/JP2015066587 with English translation thereof.

* cited by examiner

PHOTOGRAPHIC IMAGE EXCHANGE SYSTEM, IMAGING DEVICE, AND PHOTOGRAPHIC IMAGE EXCHANGE METHOD

TECHNICAL FIELD

The present invention relates to a photographic image exchange system, an imaging device, and a photographic image exchange method.

BACKGROUND ART

It is known in the related art that, in an information processing system in which information is provided to a vehicle when a central server cooperates with the vehicle, the vehicle includes a camera that provides image information and a communication device that transmits the image information to the central server, and the central server includes a communicator that receives image information from the vehicle, an access right determination unit, an upload result management unit, and an image quality confirmation unit that change a provision manner of the image information with respect to the vehicle according to a reception state of the image information, (refer to, for example, Patent Document 1).

CITATION LIST

Patent Document

[Patent Document 1]
Japanese Unexamined Patent Application, First Publication No. 2013-168078

SUMMARY OF INVENTION

Technical Problem

In the technology of the related art, however, no user can acquire a desired image such as an image obtained by imaging his or her vehicle.

The present invention takes this circumstance into account, and has an objective of providing a photographic image exchange system, imaging device, and photographic image exchange method that can provide users with desired images.

Solution to Problem

A first aspect of this disclosure is a photographic image exchange system (1) that includes an imaging device (10, 200) that has an imager (20) that performs imaging, a communicator (30) that performs communication with a server (100), and a controller (50) that controls the communicator such that an image that includes a registered target among images captured by the imager is transmitted to the server, and the server that provides the image received from the imaging device to a device used by a user who is related to the registration.

A second aspect of this disclosure is that, in the photographic image exchange system described according to the first aspect of this disclosure, the imaging device is mounted in a vehicle, the imager images a vicinity of the vehicle, and the controller controls the communicator such that an image that includes a registered vehicle among images captured by the imager is transmitted to the server.

A third aspect of this disclosure is that, in the photographic image exchange system described according to the second aspect of this disclosure, the controller determines whether or not the registered vehicle is present in the vicinity of the vehicle based on information acquired by the communicator from the server, and controls the communicator such that the image that includes the registered vehicle is transmitted to the server when the registered vehicle is determined to be present in the vicinity of the vehicle.

A fourth aspect of this disclosure is that, in the photographic image exchange system described according to the second aspect of this disclosure, the controller determines whether or not the registered vehicle is included in an image captured by the imager by analyzing the image captured by the imager, and controls the communicator such that the image captured by the imager is transmitted to the server when the registered vehicle is included.

A fifth aspect of this disclosure is that, in the photographic image exchange system described according to the second aspect of this disclosure, the controller causes imaging by the imager to start when it is confirmed that the registered vehicle is present in the vicinity of an host vehicle through inter-vehicle communication, and controls the communicator such that an image captured by the imager as a result is transmitted to the server.

A sixth aspect of this disclosure is that, in the photographic image exchange system described according to the second aspect of this disclosure, the in-vehicle device transmits identification information of the vehicle to the server along with the image that includes the registered vehicle, and the server holds information of association of the identification information of the vehicle with recipient information of the device used by the user who is related to the registration, and transmits the image received from the in-vehicle device to the device used by the user who is related to the registration using the recipient information of a device corresponding to the identification information of the vehicle received from the in-vehicle device.

A seventh aspect of this disclosure is that, in the photographic image exchange system described according to the first aspect of this disclosure, the imaging device is provided in a terminal device held by a person, and the controller controls the communicator such that an image that includes a registered person among images captured by the imager is transmitted to the server.

A eighth aspect of this disclosure is that, in the photographic image exchange system described according to the seventh aspect of this disclosure, the controller determines whether or not the registered person is present in the vicinity of the imaging device based on information acquired by the communicator from the server, and controls the communicator such that the image that includes the registered person is transmitted to the server when the registered person is determined to be present in the vicinity of the imaging device.

A ninth aspect of this disclosure is that, in the photographic image exchange system described according to the seventh aspect of this disclosure, the controller determines whether or not the registered person is included in an image captured by the imager by analyzing the image captured by the imager, and controls the communicator such that the image captured by the imager is transmitted to the server when the registered person is included.

A tenth aspect of this disclosure is that, in the photographic image exchange system described according to the seventh aspect of this disclosure, the controller causes imaging by the imager to start when it is confirmed that the registered person is present in the vicinity of the imaging device through communication between the imaging device and a device used by the registered person, and controls the communicator such that an image captured by the imager as a result is transmitted to the server.

A eleventh aspect of this disclosure is that, in the photographic image exchange system described according to the seventh aspect of this disclosure, the imaging device transmits identification information of the imaging device to the server along with the image that includes the registered person, and the server holds information of association of identification information of the imaging device with recipient information of the device used by the user who is related to the registration, and transmits the image received from the imaging device to the device used by the user who is related to the registration using the recipient information of a device corresponding to the identification information of the imaging device received from the imaging device.

A twelfth aspect of this disclosure is an imaging device that has an imager that performs imaging, a communicator that provides an image to a device that is related to a registered target and performs communication with a server, and a controller that determines whether or not the registered target is included in an image captured by the imager, and controls the communicator such that the image captured by the imager is transmitted to the server when the registered target is included.

A thirteenth aspect of this disclosure is a photographic image exchange method of performing imaging, determining whether or not a registered target is included in an image obtained by performing the imaging, and providing the image obtained by performing the imaging to a device used by a user who is related to the registration when the registered target is included.

Advantageous Effects of Invention

According to the first through fourth, twelfth, and thirteenth aspect of this disclose, users can be provided with images obtained by imaging their vehicles as desired images.

According to the first, seventh through ninth, twelfth, and thirteenth aspect of this disclose, users can be provided with images in which their appearances are imaged as desired images.

According to the fifth and tenth aspect of this disclose, a communication load on a server can be reduced, and a storage area thereof can be saved.

According to the sixth and eleventh aspect of this disclose, convenience for users can be improved.

DESCRIPTION OF EMBODIMENTS

Hereinafter, embodiments of a photographic image exchange system, an imaging device, and a photographic image exchange method of the present invention will be described with reference to drawings. In the photographic image exchange system of the present invention, an image captured by an imaging device included in a vehicle or a terminal device is transmitted to a server, and the server transmits the image received from the imaging device to a predetermined device.

First Embodiment

Figure 1:
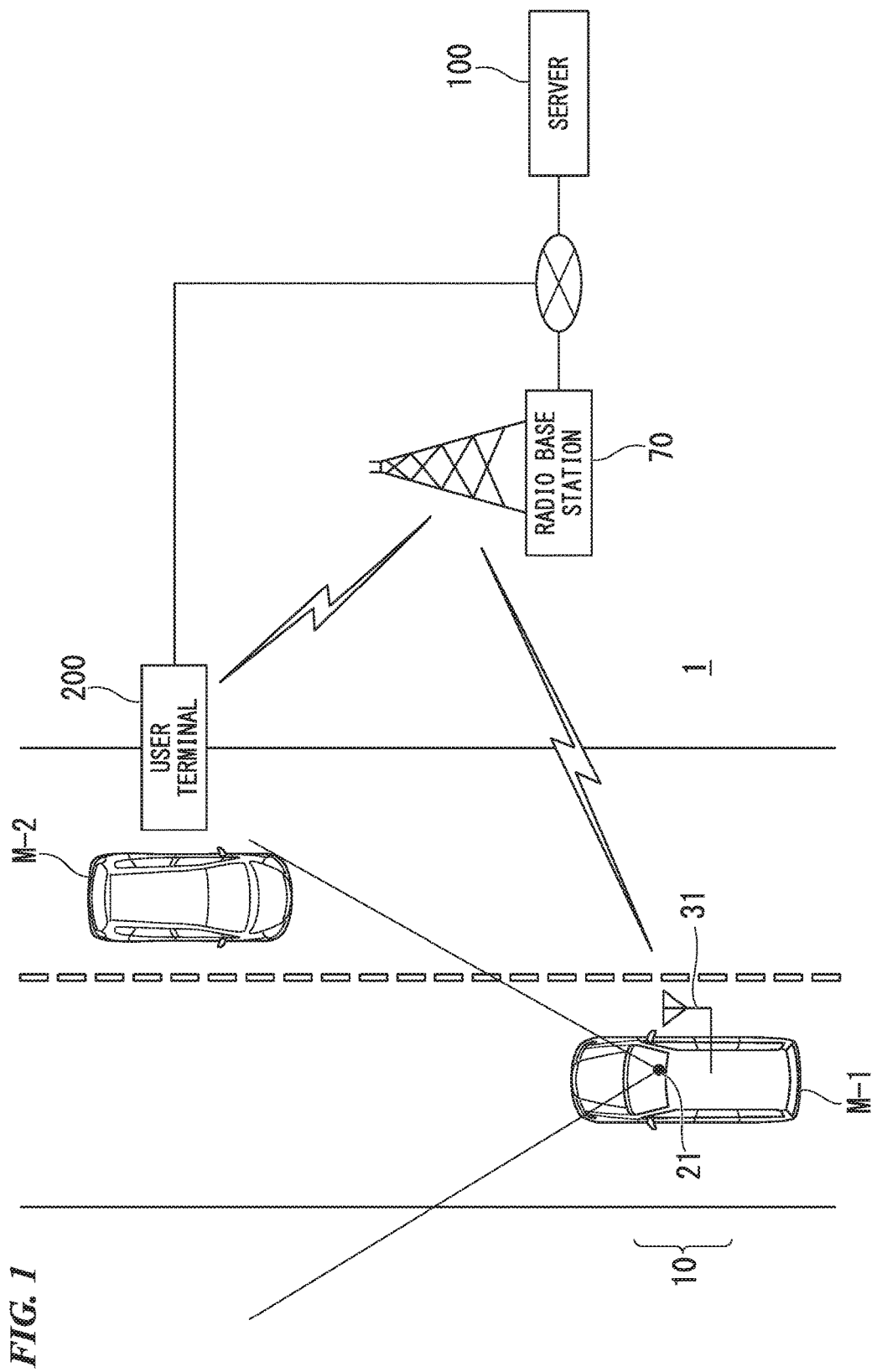
FIG. 1 is a diagram schematically showing an overall configuration of a photographic image exchange system 1 according to a first embodiment.

FIG. 1 is a diagram schematically showing an overall configuration of the photographic image exchange system 1 according to a first embodiment. In the first embodiment, an imaging device is assumed to be included in a vehicle, and description will be provided referring to the imaging device as an "in-vehicle device" unless specified otherwise. The photographic image exchange system 1 includes in-vehicle devices 10 which are respectively mounted in, for example, a plurality of vehicles M-1, M-2, . . . , and a server 100. When it is not necessary to distinguish the vehicles, their hyphens and following numbers will be omitted herein below.

Each in-vehicle device 10 has an imager such as a front view camera 21, and a communicator including an antenna 31. The in-vehicle device 10 images another vehicle using the imager, and transmits a captured image to the server 100 via the communicator. FIG. 1 shows an aspect in which the front view camera 21 of the vehicle M-1 images the running or stopped vehicle M-2 and uploads a captured image to the server 100. The image uploaded to the server 100 is provided to a user terminal 200 used by a user of the vehicle M-2. The user terminal 200 is a mobile telephone, a tablet terminal, a personal computer, an in-vehicle device, or the like. Note that a vehicle M is an example of a "target."

Communication between the in-vehicle device 10 and the server 100 is performed via, for example, a radio base station 70. For example, wireless communication is performed between the in-vehicle device 10 and the radio base station 70 using a mobile telephone network, or the like, and wired communication is performed between the radio base station 70 and the server 100 using a public line, or the like. Note that communication between the in-vehicle device 10 and the server 100 may be performed using a roadside device installed at an edge of a road. In addition, wired or wireless communication is performed between the user terminal 200 and the server 100.

According to the photographic image exchange system 1, the user (driver) of the vehicle M-2 passing by the vehicle M-1 in which the in-vehicle device 10 is mounted can receive an image of his or her vehicle M-2 captured by the camera mounted in the vehicle M-1 later via the server 100.

In addition, when in-vehicle devices 10 are mounted in both the vehicle M-1 and the vehicle M-2 in the scene as shown in FIG. 1, image data of an image obtained by imaging the vehicle M-2 by the in-vehicle device 10 of the vehicle M-1 is provided to the user terminal 200 of the user of the vehicle M-2, and image data of an image obtained by imaging the vehicle M-1 by the in-vehicle device 10 of the vehicle M-2 is provided to the user terminal 200 of the user of the vehicle M-1, as a result, images obtained by imaging each other are exchanged.

Figure 2:
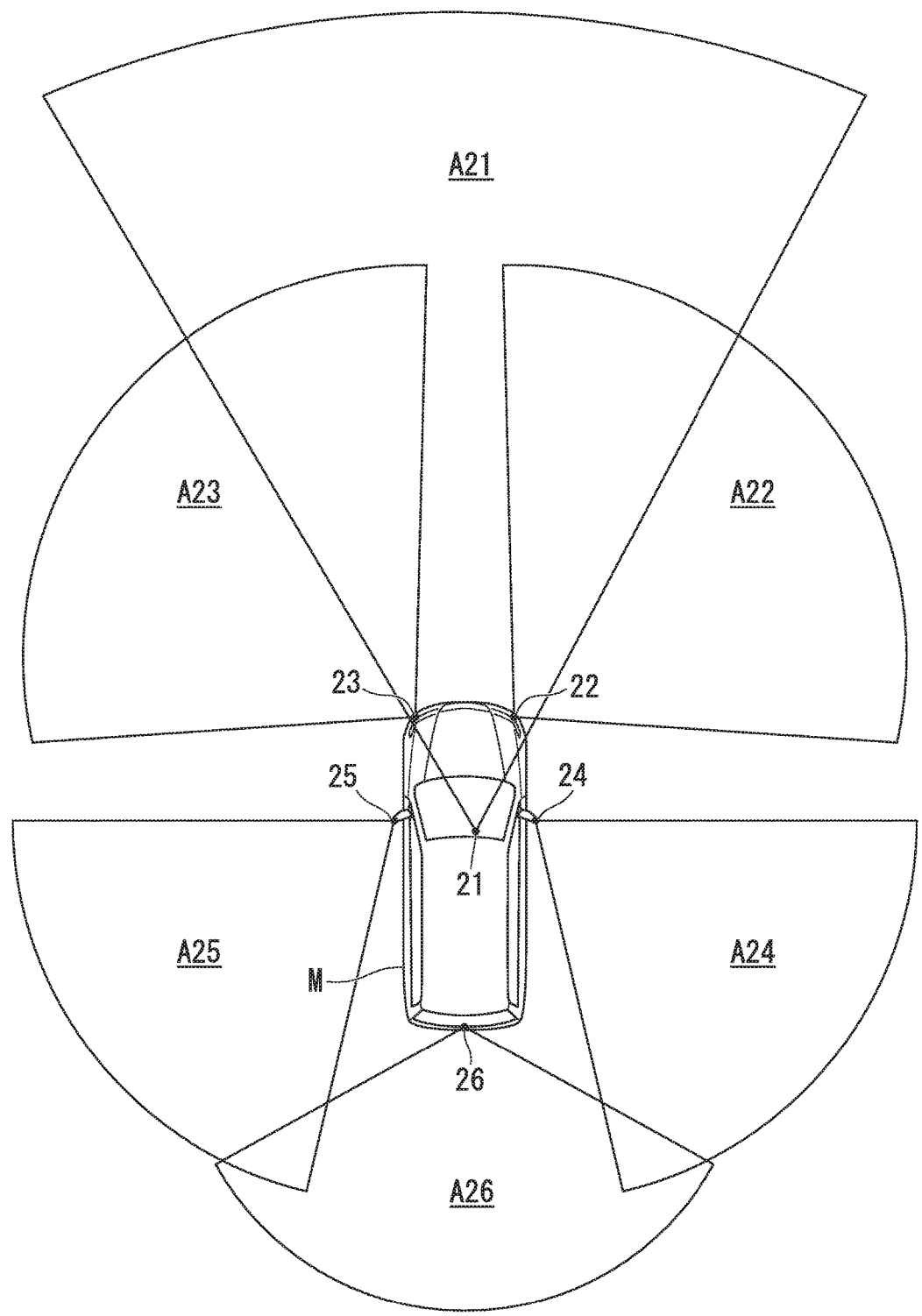
FIG. 2 is a configuration diagram of an imager 20 of an in-vehicle device 10.

FIG. 2 is a configuration diagram of an imager 20 included in the in-vehicle device 10. The imager 20 has, for example, the front view camera 21, a right-front-side view camera 22, a left-front-side view camera 23, a right-side view camera 24, a left-side view camera 25, and a rear view camera 26. The front view camera 21 is attached to a back surface or the like of the rearview mirror in an upper part of the windshield of a vehicle M to image the front direction of the vehicle M. The right-front-side view camera 22 is attached to a right end or the like of the front bumper of the vehicle M to image the right-front side of the vehicle M. The left-front-side view camera 22 is attached to a left end or the like of the front bumper of the vehicle M to image the left-front side of the vehicle M. The right-side view camera 24 is attached to the right side mirror or the like of the vehicle M to image the right side of the vehicle M. The left-side view camera 25 is attached to the left side mirror or the like of the vehicle M to image the left side of the vehicle M. The rear view camera 26 is attached to the rear bumper or the like of the vehicle M to image behind the vehicle M. In the drawing, A21 indicates an imaging area of the front view camera 21, A22 indicates an imaging area of the right-front-side view camera 22, A23 indicates an imaging area of the left-front-side view camera 22, A24 indicates an imaging area of the right-side view camera 24, A25 indicates an imaging area of the left-side view camera 25, and A26 indicates an imaging area of the rear view camera 26. These cameras are digital cameras using solid-state image sensors, for example, charge coupled devices (CCDs), complementary metal oxide semiconductors (CMOSs), or the like, capture images of vicinities of the vehicle M in a predetermined period and transmit them to a controller of the in-vehicle device 10. Note that the imager 20 may include only some of the cameras shown in FIG. 2.

Figure 3:
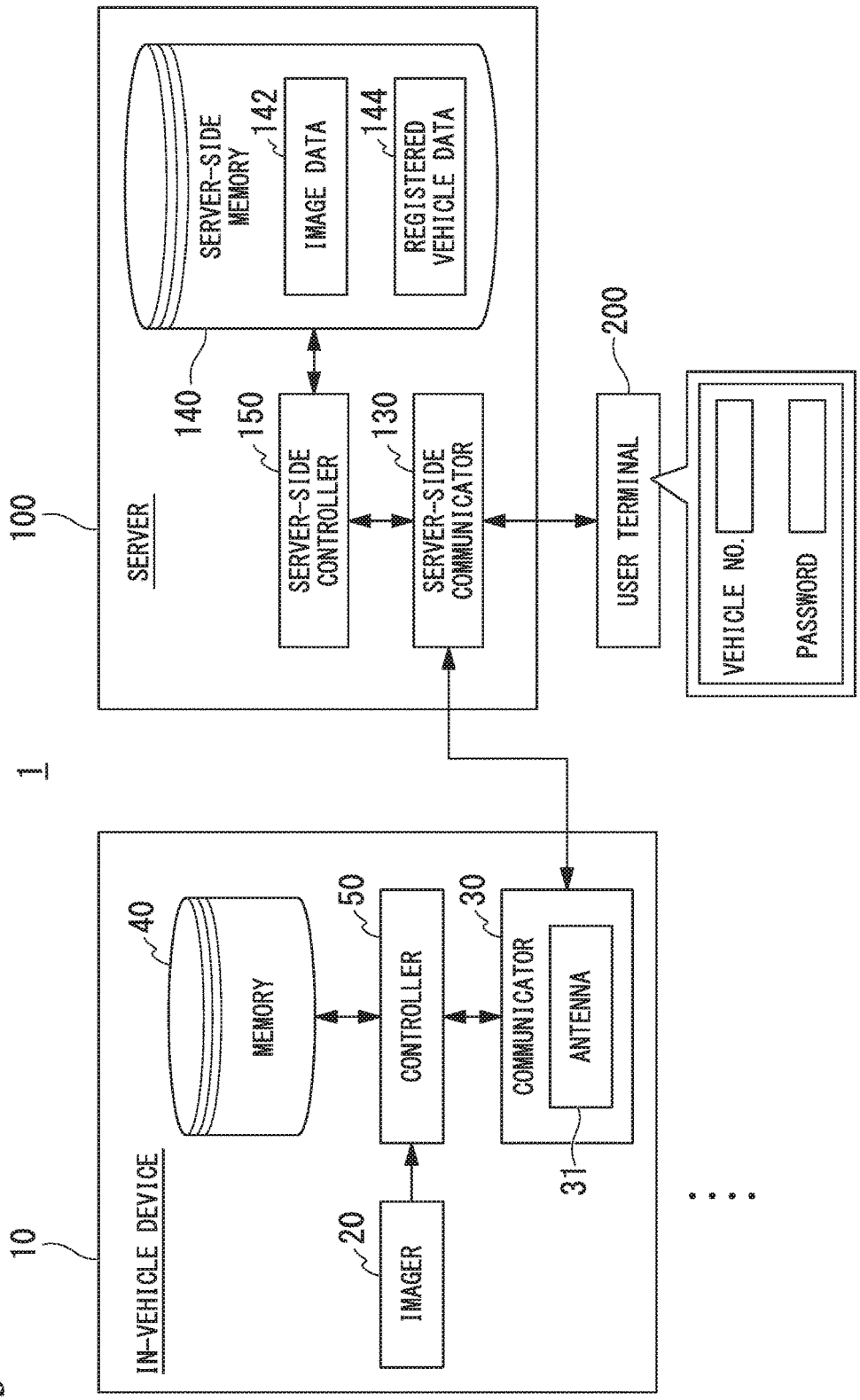
FIG. 3 is a configuration diagram of the in-vehicle device 10 and a server 100 according to the first embodiment.

FIG. 3 is a configuration diagram of the in-vehicle device 10 and the server 100 according to the first embodiment. The in-vehicle device 10 includes the imager 20, a communicator 30, a memory 40, and a controller 50. The memory 40 is realized by a storage device, for example, a read only memory (ROM), a random access memory (RAM), a flash memory, a hard disk drive (HDD), or the like. The memory 40 stores not only programs executed by a processor of the controller 50 but also image data of images captured by the imager 20, or the like. The controller 50 includes the processor such as a central processing unit (CPU), and executes processes to be described below by executing, for example, programs.

The server 100 includes a server-side communicator 130, a server-side memory 140, and a server-side controller 150. The server-side communicator 130 includes a network card and the like for connecting to a network. The server-side memory 140 is realized by a storage device such as a ROM, a RAM, a flash memory, an HDD, or the like, similarly to the memory 40 of the in-vehicle device 10. The server-side memory 140 stores not only programs executed by a processor of the server-side controller 150 but also image data 142, registered vehicle data 144, and the like. The image data 142 is a set of pieces of image data received from the in-vehicle device 10, and each piece of the image data corresponds to vehicle data (vehicle identification information). The registered vehicle data 144 is a list of vehicle data.

Figure 4:
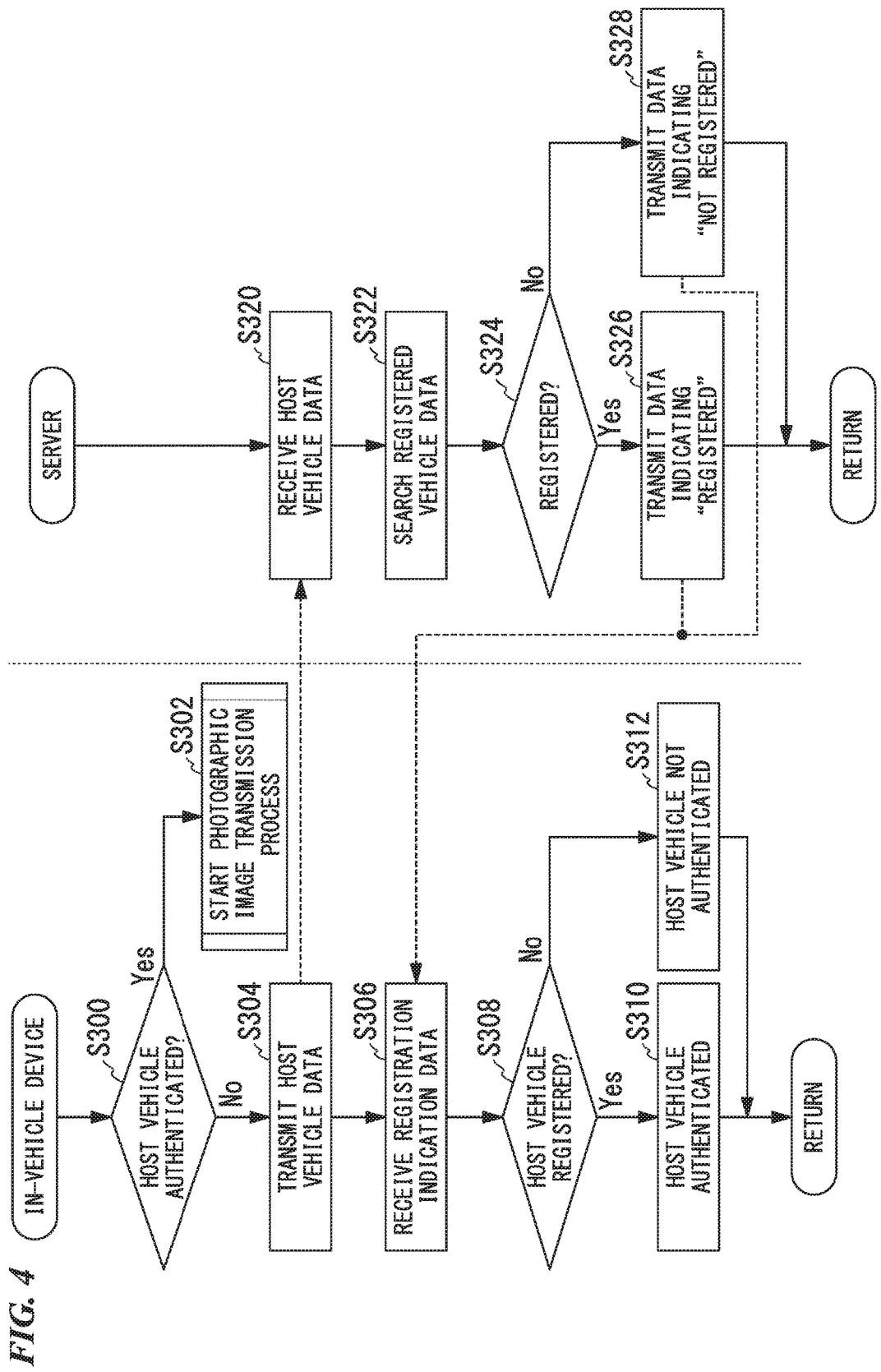
FIG. 4 is a flowchart showing an example of a flow of an authentication process executed by the in-vehicle device 10 and the server 100.

FIG. 4 is a flowchart showing an example of a flow of an authentication process executed by the in-vehicle device 10 and the server 100. The process of the present flowchart, for example, is started at a time of power on of the in-vehicle device 10 (ACC position of the vehicle, or the like), and repeatedly executed in predetermined intervals. Note that, when the present flowchart is started, the imager 20 repeatedly starts imaging. Photographic images are stored in the memory 40 in order, and when a certain number of photographic images are accumulated in the memory 40, the controller 50 deletes older photographic images in order. It is desirable for the flowcharts of FIGS. 4 and 5 to be completed within the period of time from imaging of a certain photographic image to deletion thereof.

First, the controller 50 of the in-vehicle device 10 determines whether or not the host vehicle is in an authenticated state (Step S300). Data indicating whether the host vehicle is in an authenticated state is stored in the memory 40. When the host vehicle is in an authenticated state, the controller 50 starts a photographic image transmission process (Step S302; refer to FIG. 5).

When the host vehicle is not in an authenticated state, the controller 50 transmits host vehicle data to the server 100 (Step S304). The host vehicle data may be any kind of data which the vehicle M with the in-vehicle device 10 mounted therein can be identified, and for example, license plate description information of the vehicle M may be used. The host vehicle data is input to the in-vehicle device 10 by, for example, the user of the vehicle M in advance, and stored in the memory 40.

When the host vehicle data is received (Step S320), the server 100 searches the registered vehicle data 144 using the received host vehicle data (Step S322). Then, the server 100 determines whether or not data corresponding to the received host vehicle data is present in the registered vehicle data 144, i.e., whether or not data corresponding to the host vehicle data has been registered in the registered vehicle data 144 (Step S324). When data corresponding to the host vehicle data has been registered in the registered vehicle data 144, the server 100 transmits data indicating "registered" to the in-vehicle device 10 (Step S326). On the other hand, when no data corresponding to the host vehicle data has been registered in the registered vehicle data 144, the server 100 transmits data indicating "not registered" to the in-vehicle device 10 (Step S328).

When the in-vehicle device 10 receives the data indicating "registered" or data indicating "not registered" (registration indication data) (Step S306), the controller 50 determines whether or not the host vehicle data has been registered in the registered vehicle data 144 of the server 100 based on the received registration indication data (Step S308). When the host vehicle data has been registered in the registered vehicle data 144 of the server 100, the controller 50 causes the memory 40 to store data indicating that the host vehicle is in an authenticated state (Step S310). On the other hand, when the host vehicle data has not been registered in the registered vehicle data 144 of the server 100, the controller 50 causes the memory 40 to store data indicating that it was not possible to authenticate the host vehicle (Step S312).

Figure 5:
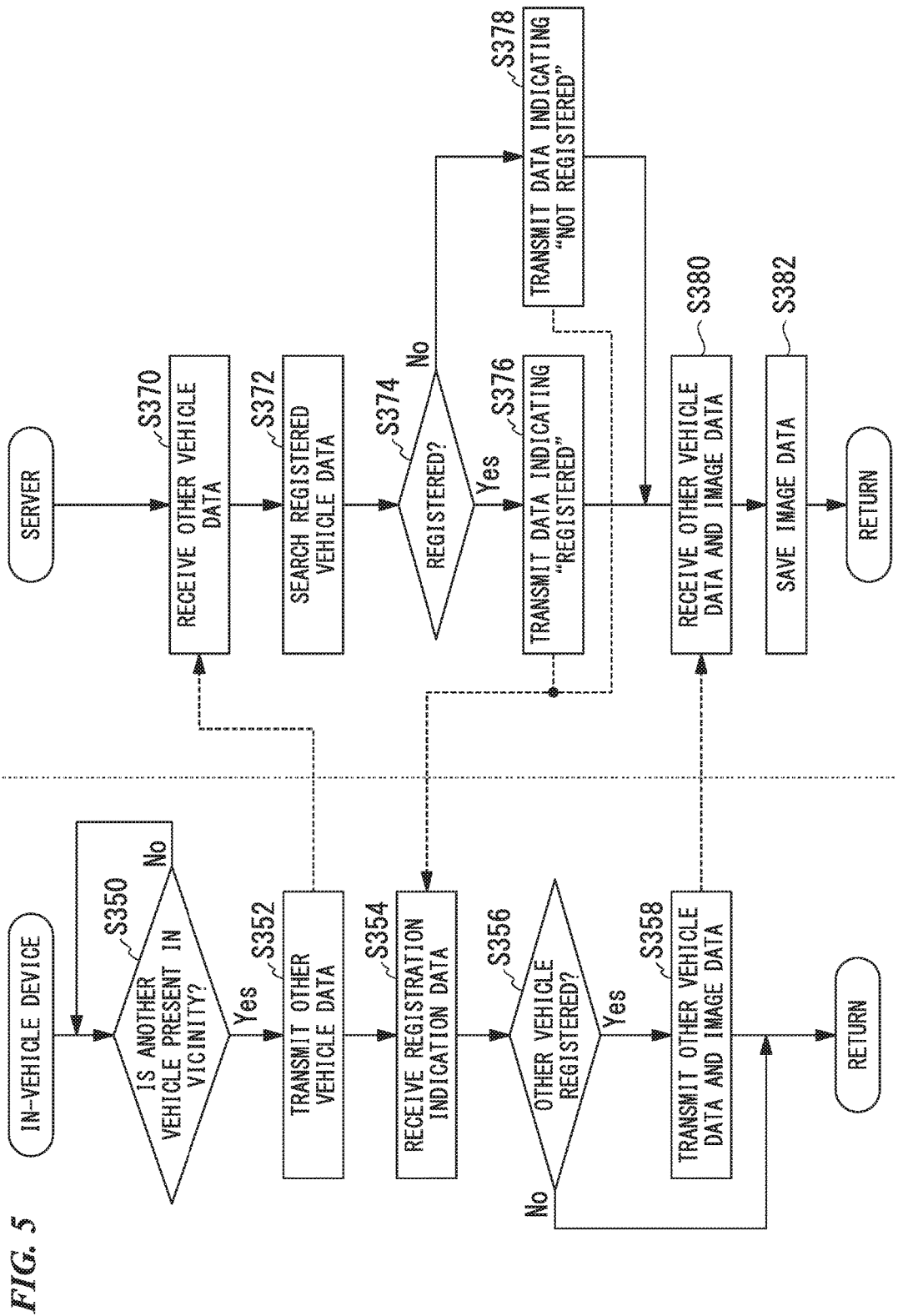
FIG. 5 is a flowchart showing an example of a flow of a photographic image transmission process executed by the in-vehicle device 10 and the server 100 according to the first embodiment.

FIG. 5 is a flowchart showing an example of a flow of a photographic image transmission process executed by the in-vehicle device 10 and the server 100 according to the first embodiment. First, the controller 50 of the in-vehicle device 10 determines whether or not another vehicle is present in the vicinity of the host vehicle (Step S350). The controller 50 can determine whether or not another vehicle is present in the vicinity of the host vehicle by, for example, referring to image analysis, a result of communication, or the like to be described in Step S352.

When another vehicle is present in the vicinity of the host vehicle, the controller 50 controls the communicator 30 such that it transmits other vehicle data to the server 100 (Step S352). The other vehicle data is, for example, license plate description information of the other vehicle obtained by analyzing an image. In this case, the controller 50 performs image analysis using an optical character recognition (OCR) technology to read license plate description information of the other vehicle. In addition, the in-vehicle device 10 may acquire other vehicle data from the other vehicle by performing wireless communication based on Wi-Fi, dedicated short range communication (DSRC), or the like.

When the other vehicle data has been received (Step S370), the server 100 searches the registered vehicle data 144 using the received other vehicle data (Step S372). Then, the server 100 determines whether or not data corresponding to the received other vehicle data is present in the registered vehicle data 144, i.e., whether or not data corresponding to the other vehicle data has been registered in the registered vehicle data 144 (Step S374). When data corresponding to the other vehicle data has been registered in the registered vehicle data 144, the server 100 transmits data indicating "registered" to the in-vehicle device 10 (Step S376). On the other hand, when no data corresponding to the other vehicle data has been registered in the registered vehicle data 144, the server 100 transmits data indicating "not registered" to the in-vehicle device 10 (Step S378).

When the in-vehicle device 10 receives the data indicating "registered" or the data indicating "not registered" (registration indication data) (Step S354), the controller 550 determines whether or not the other vehicle data has been registered in the registered vehicle data 144 of the server 100 based on the received registration indication data (Step S356). When the other vehicle data has been registered in the registered vehicle data 144 of the server 100, the controller 50 controls the communicator 30 such that it transmits (uploads) the other vehicle data and image data of an image captured by the imager 20 to the server 100 (Step S358).

When the other vehicle data and the image data are received (Step S380), the server 100 saves the image data in the server-side memory 140 in a form in which the image data is associated with the other vehicle data as the image data 142 (Step S382).

The image data saved in the server 100 as described above is transmitted to the user terminal 200 from the server 100 when a vehicle number (the other vehicle data described above) and a password are input to the user terminal 200 as shown in FIG. 3, and can be viewed in the user terminal 200.

According to the photographic image exchange system 1, the imaging device (the in-vehicle device 10), and the server 100 of the first embodiment described above, users can be provided with images obtained by imaging their host vehicles as desired images.

Here, if image data is transmitted to the server without sorting unlike in the present embodiment, when a user wants to obtain a photographed image of his or her vehicle, it is not possible to specify an image of his or her vehicle and to protect his or her privacy from other users. In addition, a load to a communication network may increase when all pieces of photographing data are transmitted to a server. On the other hand, according to the photographic image exchange system 1, and the like of the present embodiment, privacy can be protected, and a load on the communication network can be reduced.

Note that, when other vehicle data is to be acquired through communication, there may be control such that imaging is started when the registration of the other vehicle has been confirmed. In this case, instead of the process of Step S358 of FIG. 5, a process of "imaging of the vicinity of the user's vehicle by the imager 20, and controlling of the communicator 30 such that the other vehicle data and image data of an image captured by the imager 20 are transmitted to the server 100" is performed.

Second Embodiment

Figure 6:
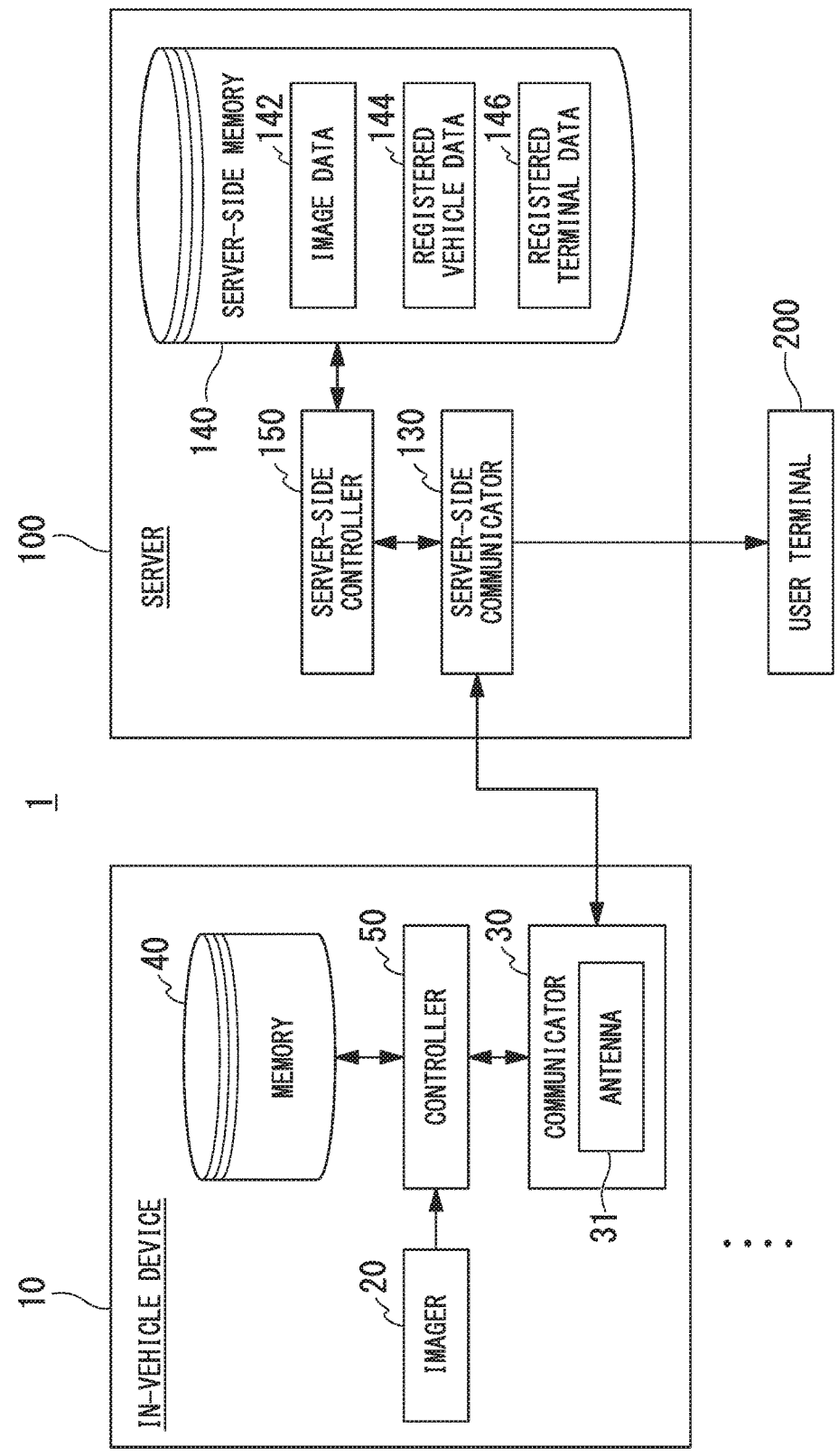
FIG. 6 is a configuration diagram of an in-vehicle device 10 and a server 100 according to a second embodiment.

A second embodiment of the present invention will be described herein below. FIG. 6 is a configuration diagram of an in-vehicle device 10 and a server 100 according to a second embodiment. A server-side memory 140 of the server 100 according to the second embodiment stores registered terminal data 146 in which respective records are associated with pieces of registered vehicle data 144. The registered terminal data 146 is, for example, a set of electronic mail addresses of user terminals 200. Accordingly, the server 100 according to the second embodiment can transmit image data to the user terminals 200, without being accessed by the user terminals 200.

Figure 7:
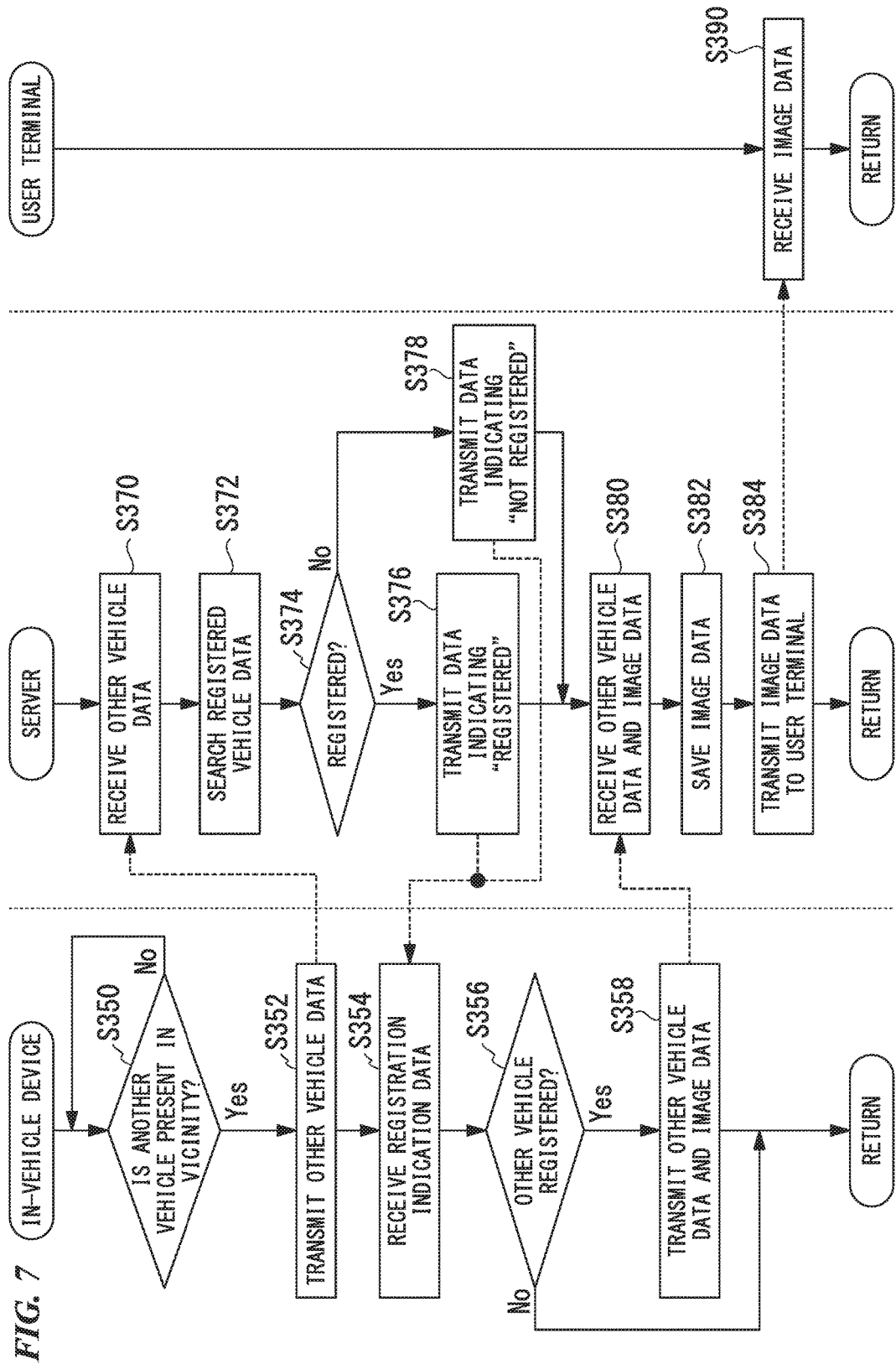
FIG. 7 is a flowchart showing an example of a flow of a photographic image transmission process executed by the in-vehicle device 10 and the server 100 according to the second embodiment.

FIG. 7 is a flowchart showing an example of a flow of a photographic image transmission process executed by the in-vehicle device 10 and the server 100 according to the second embodiment. Since processes from Steps S350 to S382 are the same as those of the flowchart according to the first embodiment, a description thereof will be omitted.

When image data is saved in the server-side memory 140 in the form in which the image data is associated with other vehicle data as image data 142 (Step S382), the server 100 searches for a record of the registered terminal data 146 corresponding to the other vehicle data, and transmits the image data to the user terminal 200 of a corresponding user, using the obtained record of the registered terminal data, i.e., an electronic mail address of the user of the vehicle corresponding to the other vehicle data, as a recipient (Step S384). The user terminal 200 receives the image data (Step S390) and allows the user to view it.

According to a photographic image exchange system 1, an imaging device (the in-vehicle device 10), and the server 100 according to the second embodiment described above, users can be provided with images obtained by imaging their host vehicles as desired images.

In addition, according to the photographic image exchange system 1, and the like of the second embodiment, the burden for users to access the server 100 can be reduced by eliminating a step for inputting a password or the like, and thus improve the convenience.

Third Embodiment

A third embodiment of the present invention will be described below. When another vehicle is present in the vicinity of a user's host vehicle, an in-vehicle device 10 according to the third embodiment determines whether or not a captured image is to be uploaded through inter-vehicle communication with the other vehicle, rather than determining whether or not the captured image is to be uploaded according to communication with a server 100. A communicator for performing inter-vehicle communication may be hardware the same as for the communicator 30 shown in FIG. 3 or FIG. 6, or may be different hardware.

Figure 8:
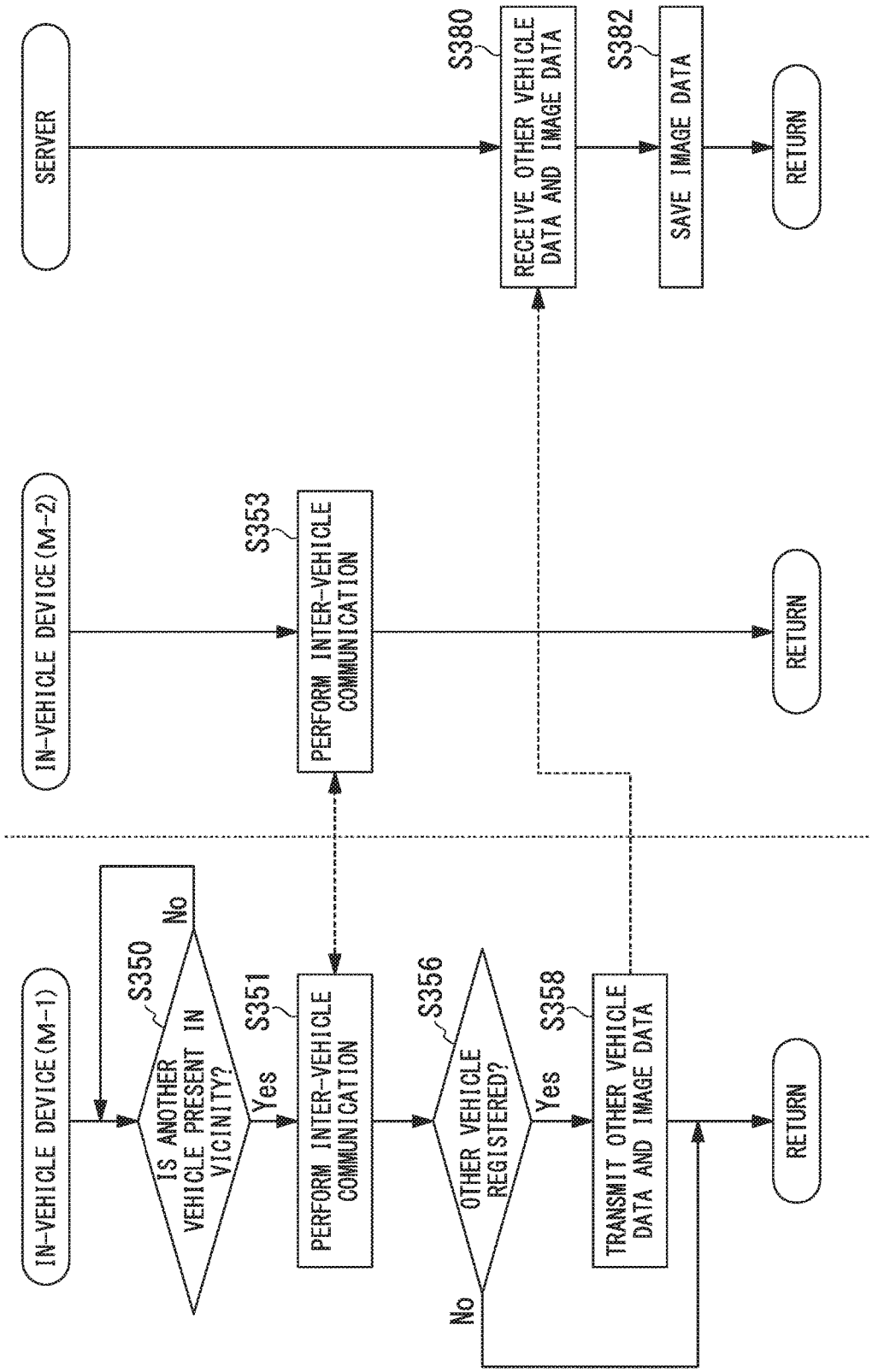
FIG. 8 is a flowchart showing an example of a flow of a photographic image transmission process executed by an in-vehicle device 10 and a server 100 according to a third embodiment.

FIG. 8 is a flowchart showing an example of a flow of a photographic image transmission process executed by an in-vehicle device 10 and the server 100 according to the third embodiment. First, a controller 50 of the in-vehicle device 10 mounted in a vehicle M-1 determines whether or not another vehicle is present in the vicinity of the host vehicle (Step S350).

When another vehicle is present in the vicinity of the host vehicle, inter-vehicle communication is performed between the in-vehicle device 10 of the vehicle M-1 and an in-vehicle device 10 of a vehicle M-2 (Steps S351 and S353).

Details of the inter-vehicle communication include that, for example, the in-vehicle device 10 of the vehicle M-1 transmitting a signal for making an inquiry to the in-vehicle device 10 of the vehicle M-2 about whether the vehicle M-2 is a vehicle that receives the service of the present invention, and the in-vehicle device 10 of the vehicle M-2 transmitting a signal for responding to the inquiry.

In addition, the details of the inter-vehicle communication may include that the in-vehicle device 10 of the vehicle M-1 transmits a signal for making an inquiry to the in-vehicle device 10 of the vehicle M-2 of vehicle data of the vehicle M-2 (license plate description information, or the like), and the in-vehicle device 10 of the vehicle M-2 responds to the inquiry with vehicle data of the host vehicle. In this case, the in-vehicle device 10 of the vehicle M-1 downloads data corresponding to registered vehicle data 144 from the server 100 in advance and uses it in determination of the next Step S356.

The in-vehicle device 10 of the vehicle M-1 determines whether or not other vehicle data has been registered in the registered vehicle data 144 of the server 100 based on the information obtained through the inter-vehicle communication (Step S356). When the other vehicle data has been registered in the registered vehicle data 144 of the server 100, the controller 50 controls a communicator 30 such that the other vehicle data and image data of an image captured by the imager 20 are transmitted (uploaded) to the server 100 (Step S358).

When the other vehicle data and the image data are received (Step S380), the server 100 saves the image data in a server-side memory 140 in a form in which the image data is associated with the other vehicle data as image data 142 (Step S382). Note that, thereafter, the image data may be transmitted to a user terminal 200 of a corresponding user, using an electronic mail address of the user of the vehicle corresponding to vehicle data of the vehicle M-2 as a recipient, as in the second embodiment.

According to a photographic image exchange system 1, an imaging device (the in-vehicle device 10), and the server 100 of the third embodiment described above, users can be provided with images obtained by imaging their host vehicles as desired images.

Furthermore, according to the photographic image exchange system 1, and the like of the third embodiment, since communication with the server 100 is not performed to determine whether or not a captured image is to be uploaded, a communication load on the server 100 can be reduced.

Fourth Embodiment

A fourth embodiment of the present invention will be described below. In the fourth embodiment, description will be provided on the assumption that an imaging device is realized as one function of a user terminal 200 used by a user, and the user terminal 200 having the function of the imaging device images a different user (another user) from the user who operates his or her own device.

In the fourth embodiment, the user terminal 200 is, for example, a mobile telephone, a tablet terminal, a wearable terminal, a personal computer, or the like. In addition, the user using the user terminal 200 in the fourth embodiment may use the user terminal 200 in a state in which he or she is getting on another conveyance such as a motorcycle, a bicycle, a boat, a yacht, or the like, or may use the user terminal 200 in a state in which he or she is simply walking or running. The user terminal 200 is used in a state in which it is held in a hand of a user, or a state in which it is held in a holder, or the like. Note that a user is an example of a "target."

Figure 9:
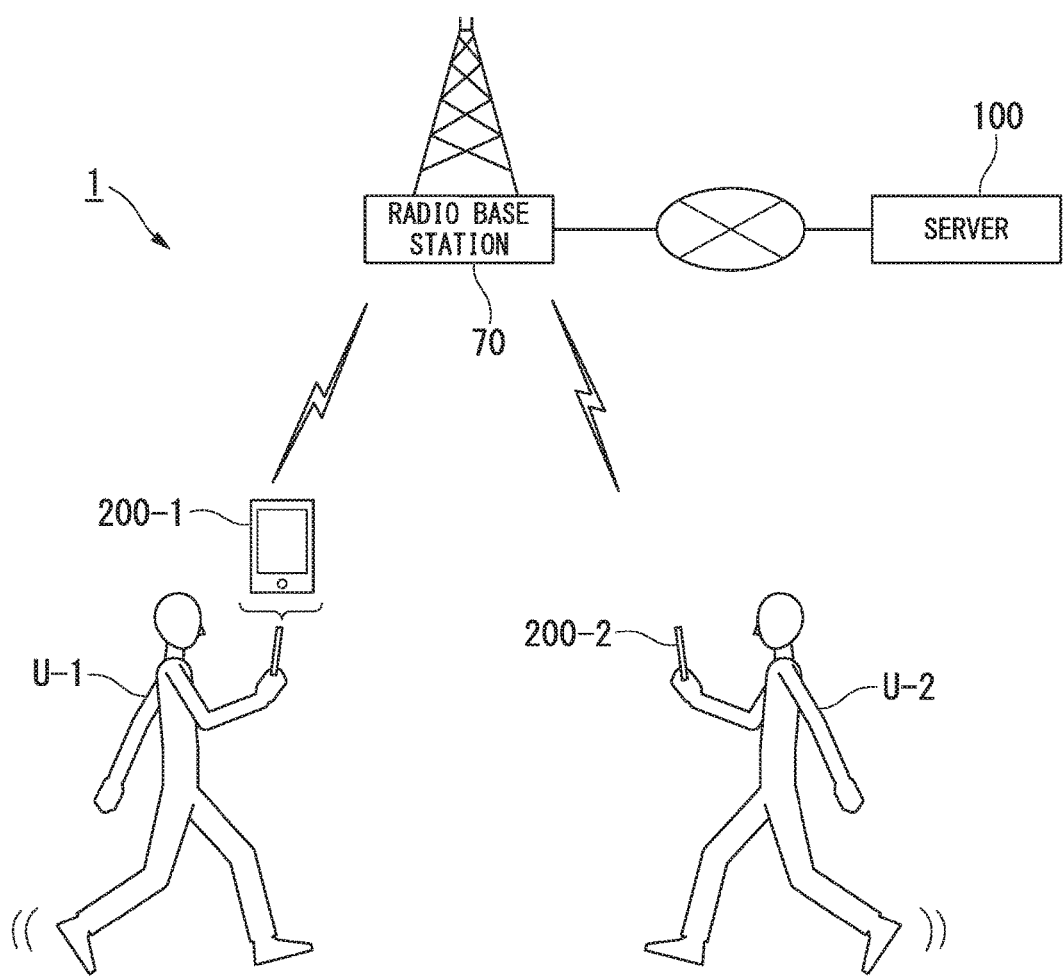
FIG. 9 is a diagram schematically showing an overall configuration of a photographic image exchange system 1 according to a fourth embodiment.

FIG. 9 is a diagram schematically showing an overall configuration of a photographic image exchange system 1 according to the fourth embodiment. The photographic image exchange system 1 according to the fourth embodiment includes, for example, user terminals 200-1, 200-2, . . . , possessed by users U-1, U-2, . . . , and a server 100. Herein below, a user will be abbreviated simply as a "user U" unless specified otherwise, and a user terminal will be abbreviated simply as a "user terminal 200" unless specified otherwise. In the present embodiment shown in FIG. 9, user terminals 200 image their vicinities while users U are walking, determine whether or not a registered user is present in the vicinity of their own devices (user terminals 200) based on captured images, and transmit the captured images to a server 100 when a registered user is present in the vicinities of their own devices (user terminals 200). The server 100 transmits images received from the user terminals 200 to the user terminal 200 held by the registered user. Herein below, focusing on the user terminal 200-1 possessed by the user U-1 and the user terminal 200-2 possessed by the user U-2 among a plurality of user terminals 200, description will be provided on the assumption that the user terminal 200-1 images the user U-2, and the user U-2 uses the user terminal 200-2 to view an image captured by the user terminal 200-1.

Figure 10:
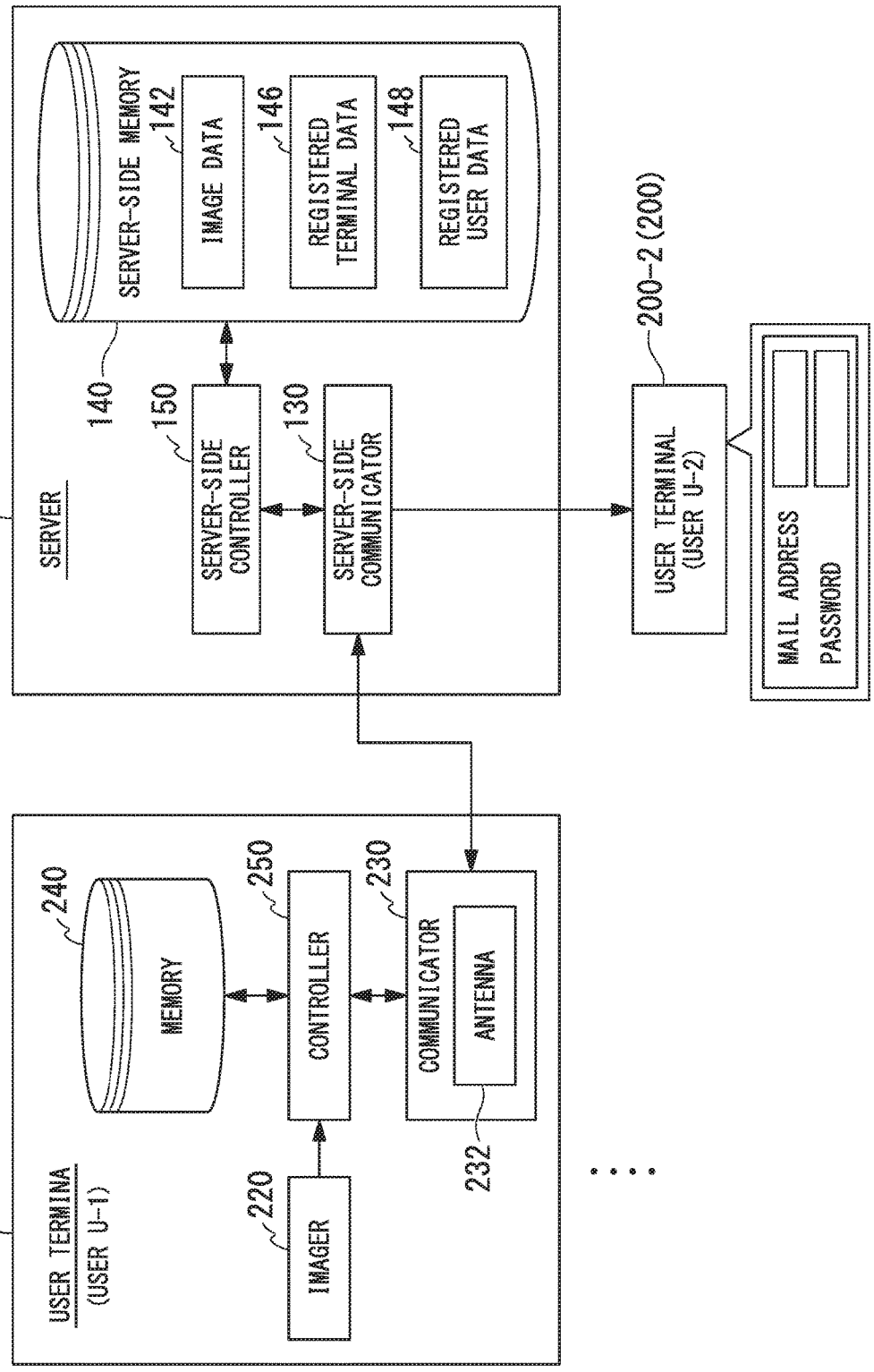
FIG. 10 is a configuration diagram of a user terminal 200 and a server 100 according to a fourth embodiment.

FIG. 10 is a configuration diagram of a user terminal 200 and the server 100 according to the fourth embodiment. The user terminal 200-1 (200) includes an imager 220, a communicator 230, a memory 240, and a controller 250. The memory 240 is realized by, for example, a storage device such as a ROM, a RAM, a flash memory, or an HDD. The memory 240 stores not only a program executed by a processor of the controller 250 but also image data of images captured by the imager 220, and the like. The controller 250 includes the processor such as a CPU, and executes processes to be described below by, for example, executing programs.

The server 100 includes a server-side communicator 130, a server-side memory 140, and a server-side controller 150. The server-side communicator 130 includes a network card, or the like for connecting to a network. The server-side memory 140 is realized by a storage device such as a ROM, a RAM, a flash memory, or an HDD, like the memory 240 of the user terminal 200-1 (200). The server-side memory 140 stores not only a program executed by a processor of the server-side controller 150 but also image data 142, registered terminal data 146, registered user data 148, and the like.

The image data 142 is a set of pieces of image data received from the user terminal 200-1 (200), and each piece of the image data is associated with identification information of user terminals 200. Identification information of a user terminal 200 refers to identification information, for example, a telephone number, a serial number of a subscriber identity module (SIM) card, a unique ID of a terminal, a unique ID on a communication network such as Wi-Fi, an electronic mail address, or the like, or may be any type of data as long as the user terminal 200 can be identified therewith. The registered terminal data 146 is a list of identification information associated with user terminals 200 used by users U. The registered user data 148 is, for example, a database in which features with which users can be specified are extracted from images in which wholes or parts of the bodies of registered users are projected and the extracted features are associated with the users who are the extraction sources. For example, in the registered user data 148, feature quantities of faces of users are associated with identification information (ID) of the users. In addition, the registered user data 148 may be images themselves from which features with which the users can be specified can be extracted. In this case, the registered user data 148 is, for example, images of a face of a user.

Figure 11:
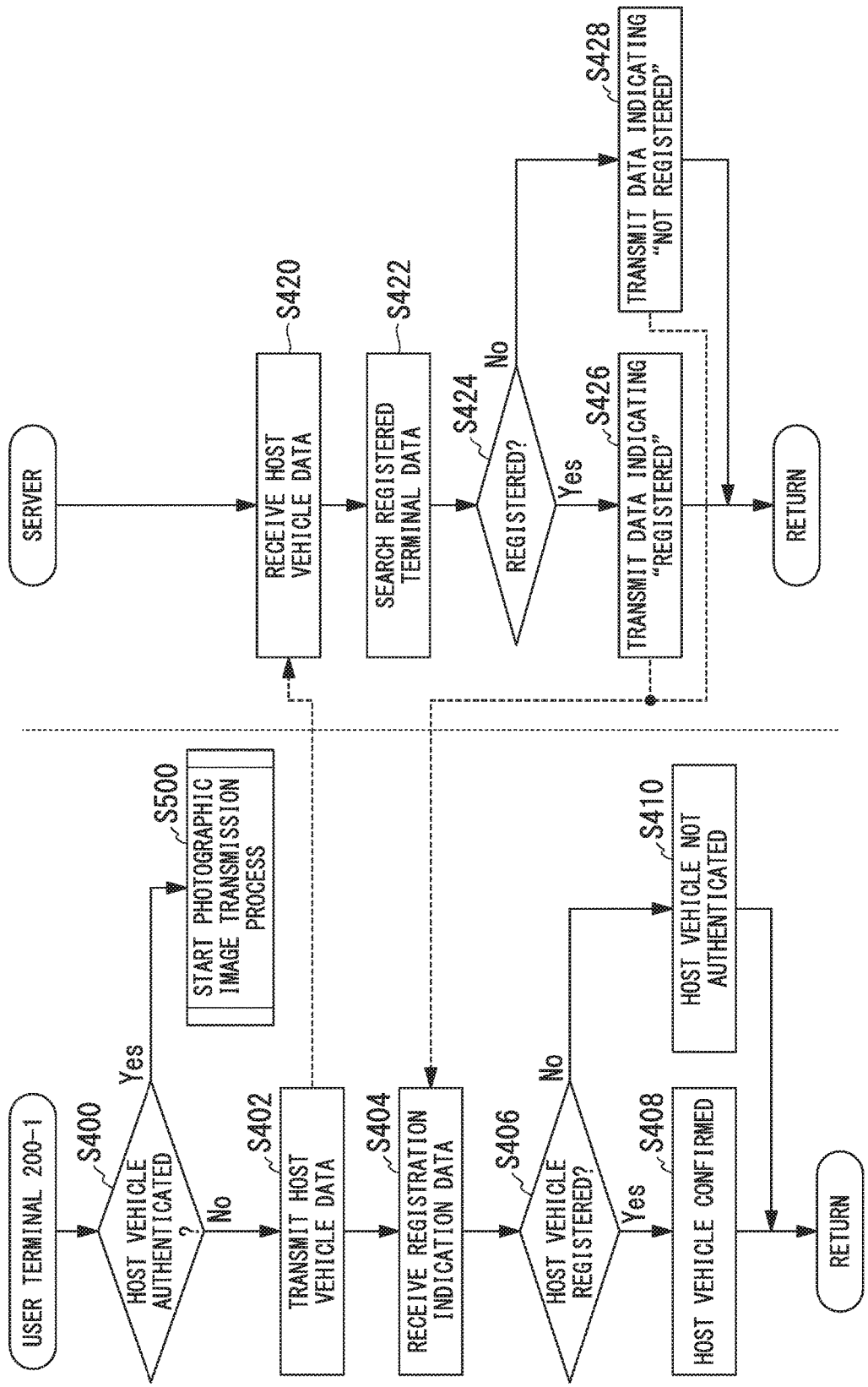
FIG. 11 is a flowchart showing an example of a flow of an authentication process executed by a user terminal 200-1 and the server 100.

The photographic image exchange system 1 according to the fourth embodiment will be described below. FIG. 11 is a flowchart showing an example of a flow of an authentication process executed by the user terminal 200-1 and the server 100. The process of the present flowchart is, for example, repeatedly executed in predetermined intervals.

First, the controller 250 of the user terminal 200-1 determines whether or not its own device is in an authenticated state (Step S400). Data indicating whether or not its own device is in an authenticated state is stored in the memory 240. When its own device is in an authenticated state, the controller 250 starts a photographic image transmission process (Step S500). Note that description of Step S500 will be provided below using FIG. 12.

When its own device is not in an authenticated state, the controller 250 transmits own-device data to the server 100 (Step S402). For the own-device data, for example, identification information of the user terminal 200-1 is used.

When the own-device data from the user terminal 200-1 (Step S420) is received, the server 100 searches the registered terminal data 146 using the received own-device data (Step S422). Then, the server 100 determines whether or not data corresponding to the received own-device data is present in the registered terminal data 146, i.e., whether or not data corresponding to the own-device data has been registered in the registered terminal data 146 (Step S424). When data corresponding to the own-device data has been registered in the registered terminal data 146, the server 100 transmits data indicating "registered" to the user terminal 200-1 (Step S426). On the other hand, when no data corresponding to the own-device data has been registered in the registered terminal data 146, the server 100 transmits data indicating "not registered" to the user terminal 200-1 (Step S428).

When the user terminal 200-1 receives the data indicating "registered" or the data indicating "not registered" (registration indication data) (Step S404), the controller 250 determines whether or not the own-device data has been registered in the registered terminal data 146 of the server 100 based on the received registration indication data (Step S406). When the own-device data has been registered in the registered terminal data 146 of the server 100, the controller 250 causes the memory 240 to store the data indicating that its own device is in an authenticated state (Step S408). On the other hand, when the own-device data has not been registered in the registered terminal data 146 of the server 100, the controller 250 causes the memory 240 to store data indicating that its own device has not been authenticated (Step S410).

Figure 12:
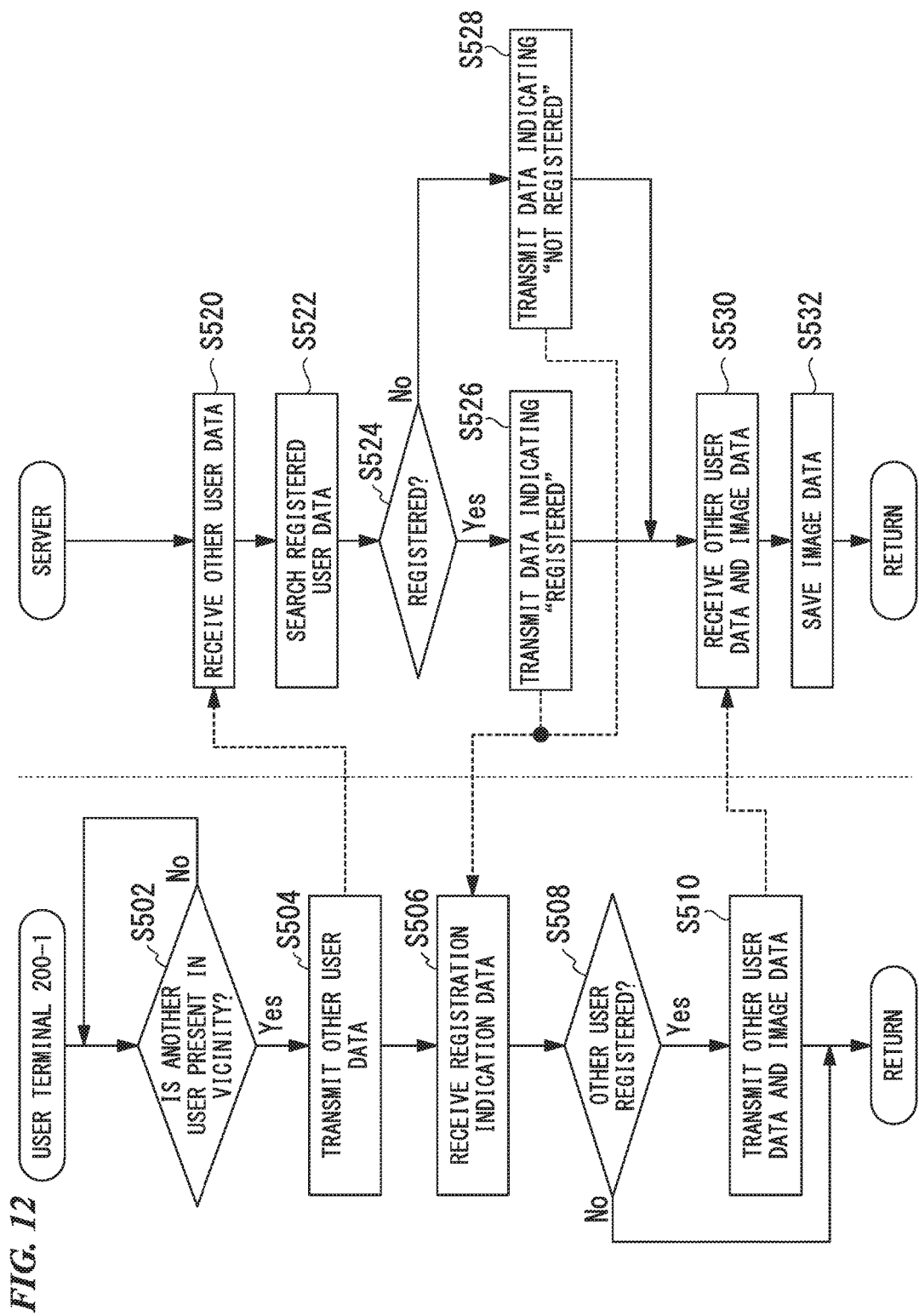
FIG. 12 is a flowchart showing an example of a flow of a photographic image transmission process executed by the user terminal 200-1 (200) and the server 100 according to the fourth embodiment.

FIG. 12 is a flowchart showing an example of a flow of the photographic image transmission process executed by the user terminal 200-1 (200) and the server 100 according to the fourth embodiment. The process of the present flowchart corresponds to Step S500 in the above-described flowchart of FIG. 11. First, the controller 250 of the user terminal 200 determines whether or not another user U is present in the vicinity of its own device (Step S502). The controller 250 can determine whether or not another user U is present in the vicinity of its own device by, for example, referring to image analysis, a result of communication, or the like to be described in Step S504.

When another user U is present in the vicinity of its own device, the controller 250 controls the communicator 230 such that other user data is transmitted to the server 100 (Step S504). The other user data refers to, for example, information indicating a feature of the user U obtained by analyzing an image. Here, the feature refers to a face feature quantity indicating, for example, a relative position or a size of a part of the face, or a shape of an eye, the nose, a cheekbone, or the jaw of the user U. In this case, the controller 250 performs a feature quantity extraction process, such as speeded-up robust features (SURF) or scale-invariant feature transform (SIFT) on the image to extract the feature quantity. At that time, if the user U is projected on the image to be subjected to the feature quantity extraction process, the controller 250 can extract a feature quantity indicating a feature of the user U form the image. In addition, the user terminal 200-1 may acquire other user data from another user terminal 200 by performing wireless communication based on Wi-Fi, Long Term Evolution (LTE), LTE-Advanced (LTE-A), LTE-Advanced Evolution (LTE-B), or the like.

When the other user data is received (Step S520), the server 100 searches the registered user data 148 using the received other user data (Step S522). Then, the server 100 determines whether or not data corresponding to the received other user data is present in the registered user data 148, i.e., whether or not data corresponding to the other user data has been registered in the registered user data 148 (Step S524). More specifically, the server 100 determines whether or not a feature (a feature quantity) included in the registered user data 148 matches a feature (a feature quantity) included in the other user data. When the feature (feature quantity) included in the other user data matches the feature (feature quantity) included in the registered user data 148, i.e., when the data corresponding to the other-use data has been registered in the registered user data 148, the server 100 transmits data indicating "registered" to the user terminal 200-1 that is the transmission source of the other user data (Step S526). On the other hand, when the feature (feature quantity) included in the other user data does not match the feature (feature quantity) included in the registered user data 148, i.e., when the data corresponding to the other-use data has not been registered in the registered user data 148, the server 100 transmits data indicating "not registered" to the user terminal 200-1 that is the transmission source of the other user data (Step S528).

When the user terminal 200-1 receives the data indicating "registered" or the data indicating "not registered" (registration indication data) (Step S506), the controller 250 of the user terminal 200-1 determines whether or not the other user data has been registered in the registered user data 148 of the server 100 based on the received registration indication data (Step S508). When the other user data has been registered in the registered user data 148 of the server 100, the controller 250 controls the communicator 230 such that the other user data and image data of an image captured by the imager 220 are transmitted (uploaded) to the server 100 (Step S510).

When the other user data and the image data are received (Step S530), the server 100 saves the image data in the server-side memory 140 in a form in which the image data is associated with the other user data as the image data 142 (Step S532).

The image data 142 stored in the server 100 as described above is transmitted to the user terminal 200-2 from the server 100 by inputting an electronic mail address that is the above-described registered terminal data 146, information of an image of a face or the like that is the registered user data 148, and a password to the user terminal 200-2 as shown in FIG. 10, and thus can be viewed in the user terminal 200-2. Note that the user U-2 may view the image data 142 saved in the server 100 using another device, instead of the user terminal 200-2.

According to the photographic image exchange system 1, the imaging device (user terminal 200), and the server 100 of the fourth embodiment described above, users can be provided with images in which their own appearances are captured as desired images.

Here, if image data is transmitted to the server 100 without sorting unlike in the present embodiment, when a user U wants to obtain an image in which his or her appearance is photographed, it is not possible to specify the user U's own image and to protect his or her privacy from other users. In addition, a communication network may be pressured when pieces of photographing data are all transmitted to the server 100. On the other hand, according to the photographic image exchange system 1, and the like of the present embodiment, privacy can be protected, and a load on the communication network can be reduced.

Note that, when other user data is to be acquired through communication, a terminal device 200 may perform control such that imaging is started after confirming that another user has been registered. In this case, instead of the process of Step S510 of FIG. 12, a process of "imaging of the vicinity of an own device being performed by the imager 220 of the terminal device 200-1 (200), and controlling of the communicator 230 such that other user data and image data of an image captured by the imager 220 are transmitted to the server 100" is performed.

Fifth Embodiment

A fifth embodiment of the present invention will be described below. The fifth embodiment will be described on the assumption that an imaging device is realized as one function of a user terminal 200 used by a user, and a user terminal 200-1 having the function of the imaging device images a different user U-2 from a user U-1 who operates his or her own device, as in the fourth embodiment. Note that, since configurations of the user terminals 200 and a server 100 of the fifth embodiment are similar to those of the fourth embodiment described above, a description thereof will be omitted.

Figure 13:
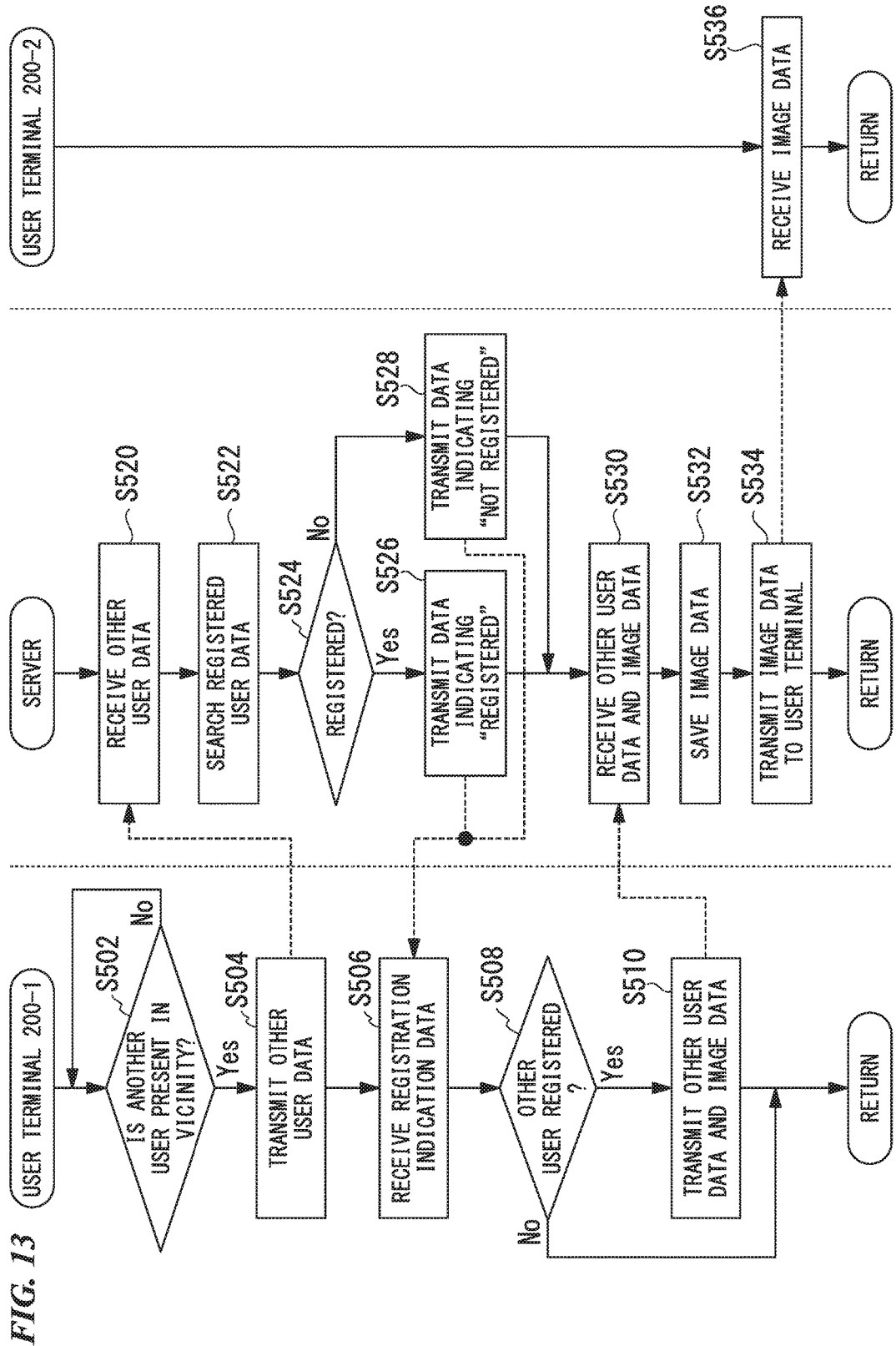
FIG. 13 is a flowchart showing an example of a flow of a series of processes executed by a user terminal 200-1, a user terminal 200-2, and a server 100 according to a fifth embodiment.

FIG. 13 is a flowchart showing an example of a flow of a series of processes executed by the user terminal 200-1, the user terminal 200-2, and the server 100 according to the fifth embodiment. Since the processes of Steps S502 to S532 in the flowchart of FIG. 13 are the same as the corresponding processes in the flowchart of FIG. 12, a description thereof will be omitted.

When image data is saved in a server-side memory 140 in a form in which the image data is associated with other user data as image data 142 (Step S532), the server 100 searches for a record of registered terminal data 146 corresponding to the other user data, and transmits the image data to the user terminal 200-2 of the user U-2 using the obtained record of registered terminal data, i.e., an electronic mail address of the user U-2 corresponding to the other user data, as a recipient (Step S534). The user terminal 200-2 receives the image data (Step S536), and allows the user U-2 to view it. Note that the server 100 may transmit the image data saved in Step S630 to another terminal device that the user U-2 can operate. For example, the server 100 may transmit the data to a desk-top personal computer installed in the user U-2's home, or the like. In addition, when the user U-2 has set a transmission destination of the image data to a group of a plurality of persons, the server 100 may transmit image data in which an appearance of the user U-2 is projected to all users of the group.

According to a photographic image exchange system 1, the imaging device (user terminal 200), and the server 100 of the fifth embodiment described above, users can be provided with images in which their appearances are captured as desired images.

In addition, according to the photographic image exchange system 1, and the like of the fifth embodiment, the burden for users to access the server 100 can be reduced by eliminating a step for inputting a password or the like, and thus improve the convenience.

Sixth Embodiment

A sixth embodiment of the present invention will be described below. The sixth embodiment will be described on the assumption that an imaging device is realized as one function of a user terminal 200 used by a user, and a user terminal 200-1 having the function of the imaging device images a different user U-2 from a user U-1 who operates his or her own device, as in the fourth and fifth embodiments. When another user U is present in the vicinity of a user's own device in the sixth embodiment, whether or not a captured image is to be uploaded through device-to-device (D2D) communication with a user terminal 200 of the user U present in the vicinity of the user's own device is determined, rather than determining whether or not the captured image is to be uploaded according to communication with a server 100. A communicator for performing D2D communication may be hardware the same as for the communicator 230 shown in FIG. 10, or may be different hardware.

Figure 14:
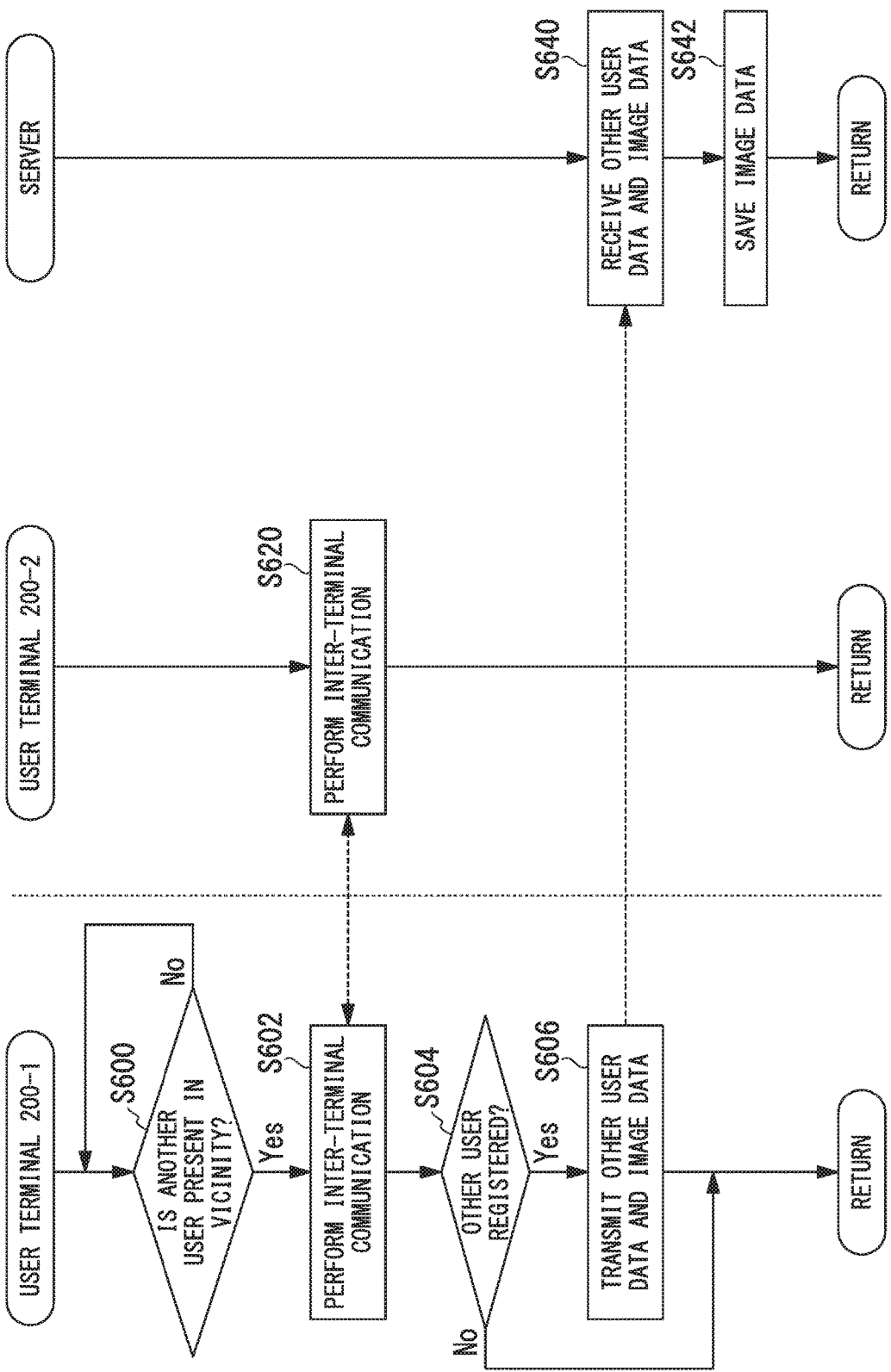
FIG. 14 is a flowchart showing an example of a flow of a series of processes executed by a user terminal 200-1, a user terminal 200-2, and a server 100 according to a sixth embodiment.

FIG. 14 is a flowchart showing an example of a flow of a series of processes executed by the user terminal 200-1, a user terminal 200-2, and the server 100 according to the sixth embodiment. First, a controller 250 of the user terminal 200-1 determines whether or not another user is present in the vicinity of its own device (Step S600).

When another user is present in the vicinity of its own device, D2D communication is performed between, for example, the user terminal 200-1 possessed by the user U-1 and the user terminal 200-2 possessed by the user U-2 (Steps S602 and S620).

The D2D communication is performed using, for example, the above-mentioned LTE. Details of the D2D communication include that, for example, the user terminal 200-1 possessed by the user U-1 transmitting a signal for making an inquiry to the user terminal 200-2 possessed by the user U-2 about whether or not the user is a user who receives the service of the present invention, and the user terminal 200-2 possessed by the user U-2 transmitting a signal for responding to the inquiry.

The user terminal 200-1 possessed by the user U-1 determines whether or not other user data has been registered in registered user data 148 of the server 100 based on information obtained through the D2D communication (Step S604). When the other user data has been registered in the registered user data 148 of the server 100, a controller 250 of the user terminal 200-1 controls the communicator 230 such that the other user data and image data of an image captured by an imager 220 are transmitted (uploaded) to the server 100 (Step S606).

When the other user data and the image data are received (Step S640), the server 100 saves the image data in a server-side memory 140 in a form in which the image data is associated with the other user data as image data 142 (Step S642). Note that, thereafter, the image data may be transmitted to the user terminal 200-2 of the user U-2, using an electronic mail address of the user U-2 corresponding to the other user data included in the uploaded image data as a recipient, as in the fifth embodiment.

According to a photographic image exchange system 1, the imaging device (user terminal 200), and the server 100 of the sixth embodiment described above, users can be provided with images in which their appearances are captured as desired images.

In addition, according to the photographic image exchange system 1, and the like of the sixth embodiment, a load of communication on the server 100 can be reduced since communication with the server 100 is not performed to determine whether or not a captured image is to be uploaded, as in the third embodiment described above.

Although the embodiments for implementing the present invention have been described above, the present invention is not limited thereto in any way, and can be variously modified and replaced within the scope not departing from the gist of the present invention.

In each of the embodiments, for example, a user who performs an input operation to the in-vehicle device 10 that is an imaging device or the user terminal 200 may switch between whether or not he or she is to be imaged by another vehicle, whether or not he or she will image another vehicle, or whether or not image data is to be automatically downloaded from the server 100. In this way, usability can be improved such that imaging is performed only at the time of personal use. As a result, a storage area of the server 100 can be saved.

Furthermore, the server 100 may be designed to automatically delete obsolete data of each registered vehicle. In this way, a storage area of the server 100 can be saved.

In addition, the in-vehicle device 10, the user terminal 200, or the server 100 may have a function of sorting out photogenic images, and uploading or saving only photogenic images. In this way, convenience can be improved, and a storage area of the server 100 can be saved as well.

Further, users may form a predetermined community in advance, and an image may be uploaded at the time of registration of vehicle data only when users of the community pass by each other. In this way, convenience can be improved, and a storage area of the server 100 can be saved as well.

In addition to the case of passing by, data of a vehicle traveling in front of another vehicle may be uploaded to the server 100. In this case, a mode in which image data of vehicles of only users who have formed such a community is transmitted to the server 100 is preferable.

Further, when a vehicle is a two-wheeled vehicle, its license plate is placed only in the rear of the vehicle, and thus recognition of the vehicle is difficult when it passes by; however, by using images captured by a right-side view camera 24 or a left-side view camera 25, the above-described processes are made possible.

In addition, communication of the in-vehicle device 10 may be performed via the user terminal 200. In this case, the in-vehicle device 10 and the user terminal 200 are connected with wires or wirelessly, and communication with the server 100 or another vehicle is performed using a wireless communication function of the user terminal 200.

Further, the user terminal 200 that also serves as an imaging device may transmit captured images directly to another user terminal 200 through inter-terminal communication such as D2D communication, without passing through the server 100. Accordingly, the photographic image exchange system 1 can enable parties concerned to exchange images captured by their user terminals 200, without accumulating them in the server 100 which is a third party. As a result, the photographic image exchange system 1 can protect privacy of users avoiding, for example, outflow of image data from the server 100 which is a third party.

REFERENCE SIGNS LIST

1 Photographic image exchange system
10 In-vehicle device
20 Imager
30 Communicator
40 Memory
50 Controller
100 Server
130 Server-side communicator
140 Server-side memory
142 Image data
144 Registered vehicle data
146 Registered terminal data
150 Server-side controller
200 User terminal
220 Imager
230 Communicator
240 Memory
250 Controller

What is claimed is:

1. A photographic image exchange system comprising:
an imaging device provided in a first vehicle that has a first registered target and that is used by a first user; and a server that provides an image to a second user device that is used by a second user who uses a second vehicle having a second registered target, wherein the imaging device includes:

an imager that performs imaging;

a communicator that performs communication with the server; and a controller that performs control in authentication process such that the imager performs imaging when the first vehicle is authenticated, and controls the communicator in photographic image transmission process such that the image captured by the imager is transmitted to the server when the controller determines that the second registered target is registered in the server to approve transmission of the image; and wherein the second user performs an input operation to the second user device or another device other than the second user device, and the controller switches whether the image related to the second registered target of the second vehicle is imaged or not based on the input operation performed by the second user, wherein the authentication process includes:

transmitting information related to the first registered target to the server;

receiving a response from the server that is sent in reply to the transmission of the first registered target; and determining whether the first vehicle is authenticated or not on the basis of the response that is received from the server, wherein the photographic image transmission process includes:

transmitting information related to the second registered target to the server;

receiving a response from the server that is sent in reply to the transmission of the information related to the second registered target; and determining whether the second registered target is registered in the server to approve transmission of the image related to the second registered target on the basis of the response that is received from the server.

2. The photographic image exchange system according to claim 1, wherein the imager images a vicinity of the first vehicle, wherein the controller controls the communicator such that, among images captured by the imager, an image that includes the second vehicle that is registered in advance is transmitted to the server.

3. The photographic image exchange system according to claim 2, wherein the controller determines whether or not the second vehicle is present in the vicinity of the first vehicle based on information acquired by the communicator from the server, and controls the communicator such that the image that includes the second vehicle is transmitted to the server when the second vehicle is determined to be present in the vicinity of the vehicle.

4. The photographic image exchange system according to claim 2, wherein the controller determines whether or not the second vehicle is included in an image captured by the imager by analyzing the image captured by the imager, and controls the communicator such that the image captured by the imager is transmitted to the server when the second vehicle is determined to be included in the image.

5. The photographic image exchange system according to claim 2, wherein the imaging device transmits identification information of the second vehicle that is registered in advance to the server along with the image that includes the second vehicle, and wherein the server holds association information of the identification information of the second vehicle with destination address information of the device used by the second user who is related to the second vehicle that is registered in advance, and transmits the image received from the imaging device to the second user device used by the second user using the destination address information of the second user device corresponding to the identification information of the second vehicle received from the imaging device.

6. The photographic image exchange system according to claim 1, wherein the imaging device is provided in a first user device held by a first person, and wherein the controller controls the communicator such that, among images captured by the imager, an image that includes the second user that is registered in advance is transmitted to the server.

7. The photographic image exchange system according to claim 6, wherein the controller determines whether or not the second user that is registered in advance is present in the vicinity of the imaging device based on information acquired by the communicator from the server, and controls the communicator such that the image that includes the second user is transmitted to the server when the second user is determined to be present in the vicinity of the imaging device.

8. The photographic image exchange system according to claim 6, wherein the controller determines whether or not the second user that is registered in advance is included in an image captured by the imager by analyzing the image captured by the imager, and controls the communicator such that the image captured by the imager is transmitted to the server when the second user is determined to be included in the image.

9. The photographic image exchange system according to claim 6, wherein the imaging device transmits identification information of the second user to the server along with the image that includes the second user, and wherein the server holds association information of identification information of the second user with destination address information of the second terminal device used by the second user that is registered in advance, and transmits the image received from the imaging device to the second terminal device used by the second user using the destination address information of the second terminal device corresponding to the identification information of the second user received from the imaging device.

10. A photographic image exchange system comprising:

an imaging device provided in a first vehicle that is used by a first user; and a server that provides an image to a second user device that is used by a second user who uses a second vehicle, wherein the imaging device includes:

an imager that is mounted in the first vehicle and images a vicinity of the first vehicle, a communicator that performs communication with the server, and a controller that causes imaging by the imager to start when it is confirmed that the second vehicle that is registered in advance to approve the transmission of an image including the second vehicle is present in a vicinity of the first vehicle through inter-vehicle communication, and controls the communicator such that, among images captured by the imager, an image that includes the second vehicle that is registered in advance is transmitted to the server through wireless communication that is different from the inter-vehicle communication; and wherein in the inter-vehicle communication, the controller confirms whether the second vehicle that is registered in advance is present in a vicinity of the first vehicle by transmitting an inquiry signal to the second vehicle and receiving a response signal sent in reply to the inquiry signal.

11. A photographic image exchange system comprising:
an imaging device; and
a server that provides an image to a second terminal device that is used by a second user,
wherein the imaging device includes:
an imager that is provided in a first terminal device held by a first user and performs imaging,
a communicator that performs communication with the server, and
a controller that controls the communicator such that, among images captured by the imager, an image that includes the second user that is registered in advance is transmitted to the server, and causes imaging by the imager to start when it is confirmed that the second user that is registered in advance to approve transmission of an image including the second user is present in a vicinity of the imaging device through communication between the imaging device and the second terminal device used by the second user.

12. An imaging device provided in a first vehicle that has a first registered target and that is used by a first user, comprising:
an imager that performs imaging when the first vehicle is authenticated in authentication process;
a communicator that performs communication with a server that provides an image to a second user device that is used by a second user who uses a second vehicle having a second registered target; and
a controller that performs control in authentication process such that the imager performs imaging when the first vehicle is authenticated, and controls the communicator in photographic image transmission process such that the image captured by the imager is transmitted to the server when the controller determines that the second registered target is registered in the server to approve transmission of the image,
wherein the second user performs an input operation to second user device or another device other than the second user device, and the controller switches whether the image related to the second registered target corresponding to the second user is imaged or not based on the input operation performed by the second user,
wherein the authentication process includes:
transmitting the first registered target to the server;
receiving a response from the server that is sent in reply to the transmission of the first registered target; and
determining whether the first vehicle is authenticated or not on the basis of the response that is received from the server,
wherein the photographic image transmission process includes:
transmitting information related to the second registered target to the server;
receiving a response from the server that is sent in reply to the transmission of the information related to the second registered target; and
determining whether the second registered target is registered in the server to approve transmission of the image related to the second registered target on the basis of the response that is received from the server.

13. A photographic image exchange method performed by an imaging device provided in a first device used by a first user corresponding to a first registered target, the photographic image exchange method comprising:
performing imaging when the first device is authenticated in authentication process;
determining whether or not a second registered target that is registered in advance is included in an image obtained by performing the imaging;
providing, in photographic image transmission process, the image obtained by performing the imaging to a second device used by a second user corresponding to the second registered target when it is determined that the second registered target is registered to approve transmission of the image; and
allowing the second user to perform an input operation to the second device or another device other than the second device, and switching whether the image related to the second registered target corresponding to the second user is provided to the second device or not based on the input operation performed by the second user
wherein the authentication process includes:
transmitting the first registered target to the server;
receiving a response from the server that is sent in reply to the transmission of the first registered target; and
determining whether the first device is authenticated or not on the basis of the response that is received from the server,
wherein the photographic image transmission process includes:
transmitting information related to the second registered target to the server;
receiving a response from the server that is sent in reply to the transmission of the information related to the second registered target; and
determining whether the second registered target is registered in the server to approve transmission of the image related to the second registered target on the basis of the response that is received from the server.

* * * * *